US010137507B2

(12) United States Patent
Novak et al.

(10) Patent No.: US 10,137,507 B2
(45) Date of Patent: *Nov. 27, 2018

(54) HOLE CUTTER WITH MULTIPLE FULCRUMS

(71) Applicant: IRWIN INDUSTRIAL TOOL COMPANY, Huntersville, NC (US)

(72) Inventors: Joseph Novak, East Longmeadow, MA (US); Justin Beach, East Hartland, CT (US); William Korb, Melrose, CT (US)

(73) Assignee: IRWIN INDUSTRIAL TOOL COMPANY, Huntersville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/608,428

(22) Filed: May 30, 2017

(65) Prior Publication Data
US 2017/0266735 A1 Sep. 21, 2017

Related U.S. Application Data

(60) Continuation-in-part of application No. 15/585,982, filed on May 3, 2017, which is a continuation of
(Continued)

(51) Int. Cl.
B23B 51/04 (2006.01)

(52) U.S. Cl.
CPC ...... B23B 51/0453 (2013.01); B23B 51/0406 (2013.01); B23B 2260/082 (2013.01); Y10T 408/895 (2015.01)

(58) Field of Classification Search
CPC ............ B23B 51/0406; B23B 51/0453; Y10T 408/895
(Continued)

(56) References Cited

U.S. PATENT DOCUMENTS

D44,561 S   8/1913 Gotjck
1,150,279 A 8/1915 Little
(Continued)

FOREIGN PATENT DOCUMENTS

CN  1392821 A    1/2003
DE  20101718 U1  5/2001
(Continued)

OTHER PUBLICATIONS

Exhibit 2006 (Declaration of Joseph Thomas Novak dated Mar. 15, 2016), filed in Inter Partes Review No. IPR2015-01461 on Mar. 15, 2016.
(Continued)

Primary Examiner — Eric A Gates
(74) Attorney, Agent, or Firm — Eversheds Sutherland (US) LLP

(57) ABSTRACT

A hole cutter can include a cylindrical blade body with a cutting edge and one or more axially-elongated apertures. Each axially-elongated aperture can include a first fulcrum axially spaced from the cutting edge, and a second fulcrum axially spaced further away from the cutting edge than the first fulcrum. The blade body can also include a third fulcrum defined by a second aperture different from the one or more axially-elongated apertures. The third fulcrum may be spaced closer to the cutting than the first and second fulcrums. A lever, such as a screw driver, can be inserted into the apertures and placed against each of the fulcrums to lever slugs out of the interior of the blade body. The third fulcrum may alternatively be defined by another axially-elongated aperture that is located a different distance from the cutting edge than the axially-elongated aperture containing the first and second fulcrums.

16 Claims, 10 Drawing Sheets

Related U.S. Application Data application No. 14/708,596, filed on May 11, 2015, now Pat. No. 9,724,766, which is a continuation of application No. 29/496,442, filed on Jul. 14, 2014, now Pat. No. Des. 789,428, which is a division of application No. 29/465,441, filed on Aug. 28, 2013, now Pat. No. Des. 711,441, which is a division of application No. 29/417,810, filed on Apr. 9, 2012, now Pat. No. Des. 692,470, which is a continuation of application No. 29/353,762, filed on Jan. 13, 2010, now Pat. No. Des. 690,334, and a continuation of application No. 29/353,759, filed on Jan. 13, 2010, now Pat. No. Des. 659,176, and a continuation of application No. 13/006,117, filed on Jan. 13, 2011, which is a continuation-in-part of application No. 12/687,078, filed on Jan. 13, 2010, said application No. 29/417,810 is a continuation of application No. 13/006,080, filed on Jan. 13, 2011, now Pat. No. 8,579,555, which is a continuation-in-part of application No. 12/687,065, filed on Jan. 13, 2010, now Pat. No. 8,579,554, application No. 15/608,428, filed on May 30, 2017, which is a continuation of application No. 15/254,926, filed on Sep. 1, 2016.

(60) Provisional application No. 62/213,764, filed on Sep. 3, 2015.

(58) Field of Classification Search
USPC .......................................... 408/204–206, 703
See application file for complete search history.

(56) References Cited

U.S. PATENT DOCUMENTS

| | | | |
|---|---|---|---|
| 1,194,503 A | 8/1915 | Jawoisch | |
| 1,234,468 A | 7/1917 | Hamilton | |
| 1,494,897 A | 5/1924 | Herman | |
| 1,564,105 A | 12/1925 | Ouellet | |
| 1,713,972 A | 5/1929 | Lufkin | |
| 2,179,029 A | 11/1939 | Ernest | |
| 2,312,176 A | 2/1943 | Kotowski | |
| 2,319,528 A | 5/1943 | Barbour et al. | |
| D139,299 S | 10/1944 | Walters | |
| 2,427,085 A | 9/1947 | Allison | |
| 2,473,077 A | 6/1949 | Starbuck | |
| 2,482,439 A | 9/1949 | Smith | |
| D160,574 S | 10/1950 | Carlson | |
| 2,633,040 A | 3/1953 | Schlage | |
| 2,779,361 A | 1/1957 | Mckiff | |
| 2,794,469 A | 6/1957 | Shortell | |
| 2,800,812 A * | 7/1957 | Mueller | B23B 51/044 408/224 |
| 2,817,899 A | 12/1957 | Wheeler | |
| 2,852,967 A | 9/1958 | Mueller et al. | |
| 2,947,206 A | 8/1960 | Flanagan | |
| 3,162,067 A | 12/1964 | Koons et al. | |
| 3,220,449 A | 11/1965 | Franklin | |
| 3,221,709 A | 12/1965 | Montemayor | |
| D204,877 S | 5/1966 | West | |
| 3,331,455 A * | 7/1967 | Anderson, Jr. | B23B 51/0406 175/386 |
| 3,387,637 A | 6/1968 | Richard et al. | |
| 3,390,596 A | 7/1968 | Trevathan | |
| 3,495,359 A | 2/1970 | Smith et al. | |
| 3,593,419 A | 7/1971 | Hula | |
| 3,610,768 A | 10/1971 | Cochran | |
| 3,765,789 A | 10/1973 | Hougen | |
| 3,804,238 A | 4/1974 | Howard | |
| 3,810,514 A | 5/1974 | Viscovich | |
| 3,880,546 A | 4/1975 | Segal | |
| 3,929,050 A | 12/1975 | Salzwedel | |
| 3,973,862 A | 8/1976 | Segal | |
| 4,077,737 A | 3/1978 | Morse | |
| 4,089,112 A | 5/1978 | Richards | |
| 4,180,909 A | 1/1980 | Lind | |
| D264,800 S | 6/1982 | Osada | |
| D266,735 S | 11/1982 | Hahn | |
| 4,408,935 A | 10/1983 | Miyanaga | |
| 4,541,758 A | 9/1985 | Frank et al. | |
| D281,979 S | 12/1985 | Meier | |
| D282,369 S | 1/1986 | Villiers | |
| 4,595,321 A | 6/1986 | Dalen | |
| 4,631,829 A | 12/1986 | Schmidt et al. | |
| 4,651,425 A | 3/1987 | Livian | |
| 4,652,185 A | 3/1987 | Malrick | |
| 4,660,284 A | 4/1987 | DeCarolis | |
| 4,755,087 A | 7/1988 | Parent | |
| 4,757,612 A | 7/1988 | Peyrot | |
| 4,760,643 A | 8/1988 | Juma | |
| D300,897 S | 5/1989 | Hagberg et al. | |
| D303,118 S | 8/1989 | Cox | |
| 4,891,884 A | 1/1990 | Torbet | |
| 5,007,777 A | 4/1991 | Itokazu | |
| D317,455 S | 6/1991 | Martin | |
| 5,044,393 A | 9/1991 | Jiles | |
| 5,049,010 A | 9/1991 | Oakes | |
| 5,058,620 A | 10/1991 | Jiles | |
| 5,061,126 A | 10/1991 | Cain et al. | |
| 5,082,403 A | 1/1992 | Sutton et al. | |
| D324,326 S | 3/1992 | Lu | |
| 5,171,111 A | 12/1992 | Kishimoto | |
| 5,205,675 A | 4/1993 | Hamel | |
| 5,205,685 A | 4/1993 | Herbert | |
| D342,270 S | 12/1993 | Kwang | |
| 5,351,595 A | 10/1994 | Johnston | |
| 5,360,300 A | 11/1994 | Sullivan | |
| D359,967 S | 7/1995 | Eichenberg et al. | |
| 5,451,128 A * | 9/1995 | Hattersley | B23B 51/0466 407/107 |
| D368,633 S | 4/1996 | Nakayama | |
| 5,597,274 A | 1/1997 | Behner | |
| 5,651,646 A | 7/1997 | Banke et al. | |
| D382,885 S | 8/1997 | Deiner et al. | |
| 5,676,501 A | 10/1997 | Peetz et al. | |
| D388,318 S | 12/1997 | Achterberg | |
| D391,974 S | 3/1998 | Brutscher | |
| D392,297 S | 3/1998 | Brutscher | |
| 5,791,837 A | 8/1998 | Johnson | |
| 5,803,677 A | 9/1998 | Brutscher et al. | |
| 5,803,678 A | 9/1998 | Korb et al. | |
| 5,806,189 A | 9/1998 | Bailey | |
| 5,820,315 A | 10/1998 | Collard | |
| D401,822 S | 12/1998 | Pearlman | |
| D406,220 S | 3/1999 | Schmidt | |
| D408,831 S | 4/1999 | McGregor | |
| 5,904,454 A | 5/1999 | Washer | |
| 5,906,050 A | 5/1999 | Gilbert | |
| 5,909,930 A | 6/1999 | Ragland, III et al. | |
| D412,654 S | 8/1999 | Gilbert et al. | |
| D412,655 S | 8/1999 | Gilbert et al. | |
| D412,822 S | 8/1999 | Gilbert et al. | |
| D422,185 S | 4/2000 | Gold | |
| D423,038 S | 4/2000 | Shimoyama | |
| 6,120,220 A | 9/2000 | Speare | |
| 6,152,661 A | 11/2000 | Thrasher | |
| D438,219 S | 2/2001 | Brutscher | |
| D443,495 S | 6/2001 | Wang | |
| D450,552 S | 11/2001 | Mason | |
| 6,341,925 B1 | 1/2002 | Despres | |
| 6,357,973 B2 | 3/2002 | Chao | |
| D455,057 S | 4/2002 | Medhurst | |
| 6,363,614 B1 | 4/2002 | Umstead et al. | |
| D457,269 S | 5/2002 | Arey | |
| D459,172 S | 6/2002 | Bissell | |
| 6,409,436 B1 | 6/2002 | Despres | |
| 6,438,849 B1 | 8/2002 | Wonderley | |
| D462,241 S | 9/2002 | Lothe | |
| 6,564,887 B2 | 5/2003 | Hong et al. | |
| 6,578,268 B2 | 6/2003 | Hawketts | |
| 6,588,992 B2 | 7/2003 | Rudolph | |
| 6,599,063 B1 | 7/2003 | Capstran | |

(56) References Cited

U.S. PATENT DOCUMENTS

| | | |
|---|---|---|
| D478,105 S | 8/2003 | Morton et al. |
| D478,106 S | 8/2003 | Morton et al. |
| D478,339 S | 8/2003 | Morton et al. |
| D478,919 S | 8/2003 | Morton et al. |
| 6,623,220 B2 | 9/2003 | Nuss et al. |
| 6,641,338 B2 | 11/2003 | Despres |
| 6,676,343 B2 | 1/2004 | Burk |
| 6,708,410 B2 | 3/2004 | Okada |
| 6,718,640 B1 | 4/2004 | John |
| 6,746,187 B2 | 6/2004 | Alm |
| 6,786,684 B1 | 9/2004 | Ecker |
| 6,820,519 B2 | 11/2004 | Lefebvre |
| 6,857,831 B2 | 2/2005 | Davis |
| 6,883,968 B2 | 4/2005 | Fugel et al. |
| 6,893,194 B2 | 5/2005 | Jones et al. |
| D508,389 S | 8/2005 | Polk |
| 6,948,574 B2 | 9/2005 | Cramer et al. |
| D516,594 S | 3/2006 | Morton |
| D517,894 S | 3/2006 | Kondo et al. |
| 7,003,833 B2 | 6/2006 | Feliciano |
| 7,097,397 B2 | 8/2006 | Keightley |
| 7,101,124 B2 | 9/2006 | Keightley |
| 7,127,979 B2 | 10/2006 | Kocher et al. |
| 7,160,064 B2 | 1/2007 | Jasso |
| 7,163,362 B2 | 1/2007 | Keightly |
| 7,189,036 B1 | 3/2007 | Watson |
| D539,616 S | 4/2007 | Taylor et al. |
| 7,237,291 B2 | 7/2007 | Redford |
| 7,258,513 B2 | 8/2007 | Gertner |
| D551,269 S | 9/2007 | Burke, III |
| D559,044 S | 1/2008 | Ono |
| D562,651 S | 2/2008 | Harkey |
| 7,340,836 B2 | 3/2008 | Whitemiller et al. |
| D565,382 S | 4/2008 | Watanabe |
| D588,175 S | 3/2009 | Morton |
| 7,553,114 B2 | 6/2009 | Oknestam et al. |
| 7,556,459 B2 | 7/2009 | Rompel |
| 7,611,312 B2 | 11/2009 | Miyanaga |
| 7,621,703 B2 | 11/2009 | Keightley |
| 7,637,703 B2 | 12/2009 | Khangar et al. |
| 7,658,136 B2 | 2/2010 | Rompel et al. |
| 7,658,576 B1 | 2/2010 | Buzdum et al. |
| 7,661,913 B2 | 2/2010 | Nordlin |
| 7,674,078 B1 | 3/2010 | Buzdum et al. |
| D620,035 S | 7/2010 | Eades |
| 7,785,047 B2 | 8/2010 | Jauch |
| D624,808 S | 10/2010 | Krawczak et al. |
| 7,818,867 B1 | 10/2010 | Capstran et al. |
| 7,824,137 B2 | 11/2010 | Vasudeva et al. |
| 7,850,405 B2 | 12/2010 | Keightley |
| D631,732 S | 2/2011 | Krawczak et al. |
| 7,886,445 B2 | 2/2011 | Constantine et al. |
| 7,921,568 B2 | 4/2011 | Green |
| 7,934,893 B2 | 5/2011 | Gillissen |
| 7,959,371 B2 | 6/2011 | Keightley |
| 7,967,535 B2 | 6/2011 | Eiserer et al. |
| D644,327 S | 8/2011 | Singh |
| 8,052,356 B2 | 11/2011 | Singh |
| 8,079,787 B2 | 12/2011 | Chao |
| 8,113,748 B2 | 2/2012 | Werner |
| 8,123,443 B2 | 2/2012 | Khangar et al. |
| D659,176 S | 5/2012 | Novak et al. |
| D664,574 S | 7/2012 | Burke, III |
| 8,221,037 B2 | 7/2012 | Neitzell |
| 8,459,381 B2 | 6/2013 | Pearce et al. |
| D687,472 S | 8/2013 | Novak et al. |
| D690,334 S | 9/2013 | Zielonka et al. |
| D692,470 S | 10/2013 | Novak et al. |
| 8,573,907 B2 | 11/2013 | Kalomeris et al. |
| 8,579,554 B2 | 11/2013 | Novak et al. |
| 8,579,555 B2 | 11/2013 | Novak et al. |
| 8,646,601 B2 | 2/2014 | Green et al. |
| D701,544 S | 3/2014 | Novak et al. |
| 8,684,641 B2 | 4/2014 | Moffatt |
| 8,696,268 B2 | 4/2014 | Bell et al. |
| D706,845 S | 6/2014 | Richter |
| 8,739,414 B2 | 6/2014 | Tyers |
| D708,650 S | 7/2014 | Richter |
| D711,441 S | 8/2014 | Novak et al. |
| 9,022,703 B2 | 5/2015 | Keightley |
| 9,120,162 B2 | 9/2015 | Keightley |
| 9,233,424 B2 | 1/2016 | Grolimund et al. |
| 9,248,513 B2 | 2/2016 | Lai |
| 2002/0037201 A1 | 3/2002 | Despres |
| 2002/0121023 A1 | 9/2002 | Kocher et al. |
| 2002/0122703 A1 | 9/2002 | Czyzewski et al. |
| 2003/0084575 A1 | 5/2003 | Chen |
| 2003/0088985 A1 | 5/2003 | Huang |
| 2003/0094078 A1 | 5/2003 | Clanton |
| 2003/0200661 A1 | 10/2003 | Okada |
| 2004/0042861 A1 | 3/2004 | Capstran |
| 2005/0022390 A1 | 2/2005 | Whitemiller et al. |
| 2005/0050734 A1 | 3/2005 | Kesinger |
| 2005/0172416 A1 | 8/2005 | Feliciano |
| 2005/0193566 A1 | 9/2005 | Brown et al. |
| 2005/0214086 A1 | 9/2005 | Nicholas |
| 2005/0244238 A1 | 11/2005 | Burk |
| 2005/0262702 A1 | 12/2005 | Hawthorn |
| 2006/0130629 A1 | 6/2006 | Rompel |
| 2006/0285934 A1 | 12/2006 | Keightley |
| 2007/0003386 A1 | 1/2007 | Keightley |
| 2007/0036620 A1 | 2/2007 | Keightley |
| 2007/0110527 A1 | 5/2007 | Jasso |
| 2007/0166116 A1 | 7/2007 | Olson et al. |
| 2007/0212179 A1 | 9/2007 | Khangar et al. |
| 2007/0227012 A1 | 10/2007 | Constantine et al. |
| 2007/0245574 A1 | 10/2007 | Green |
| 2007/0269280 A1 | 11/2007 | Vasudeva et al. |
| 2008/0019785 A1 | 1/2008 | Keightley |
| 2008/0050189 A1 | 2/2008 | Keightley |
| 2008/0131223 A1 | 6/2008 | Jauch |
| 2008/0181738 A1 | 7/2008 | Capriotti et al. |
| 2008/0187405 A1 | 8/2008 | Nordlin |
| 2008/0260480 A1 | 10/2008 | Keightley |
| 2009/0035082 A1 | 2/2009 | Singh |
| 2009/0044674 A1 | 2/2009 | Neitzell |
| 2009/0106909 A1 | 4/2009 | Tyers |
| 2009/0169317 A1 | 7/2009 | Rae |
| 2009/0252567 A1 | 10/2009 | Gillissen |
| 2009/0304468 A1 | 12/2009 | Duggan |
| 2010/0034608 A1 | 2/2010 | Nordlin et al. |
| 2010/0047030 A1 | 2/2010 | Eiserer et al. |
| 2010/0067995 A1 | 3/2010 | Keightley |
| 2010/0080665 A1 | 4/2010 | Keightley |
| 2010/0086372 A1 | 4/2010 | Werner |
| 2010/0247258 A1 | 9/2010 | Keightley |
| 2010/0310332 A1 | 12/2010 | Serba |
| 2011/0027030 A1 | 2/2011 | Capstran et al. |
| 2011/0052340 A1 | 3/2011 | Kozak |
| 2011/0170965 A1 | 7/2011 | Novak et al. |
| 2011/0170966 A1 | 7/2011 | Novak et al. |
| 2011/0170967 A1 | 7/2011 | Novak et al. |
| 2011/0170968 A1 | 7/2011 | Moffatt |
| 2011/0170969 A1 | 7/2011 | Novak et al. |
| 2011/0170970 A1 | 7/2011 | Kalomeris et al. |
| 2011/0170971 A1 | 7/2011 | Novak et al. |
| 2011/0170972 A1 | 7/2011 | Zielonka et al. |
| 2011/0217133 A1 | 9/2011 | Ibarra et al. |
| 2011/0243675 A1 | 10/2011 | Fach |
| 2012/0009032 A1 | 1/2012 | Grussenmeyer |
| 2012/0183366 A1 | 7/2012 | Stenman |
| 2013/0277256 A1 | 10/2013 | Green |
| 2014/0023446 A1* | 1/2014 | Piller .................. B23B 51/0406 408/204 |
| 2014/0271007 A1* | 9/2014 | Richter ............... B23B 51/0453 408/204 |
| 2014/0369775 A1 | 12/2014 | Lai |
| 2015/0053746 A1* | 2/2015 | Shelton, IV ......... A61B 17/072 227/177.1 |

FOREIGN PATENT DOCUMENTS

| | | |
|---|---|---|
| EP | 0295309 A | 12/1988 |
| EP | 1080859 A | 3/2001 |

(56) References Cited

FOREIGN PATENT DOCUMENTS

| JP | S48-77488 | A | 10/1973 |
|---|---|---|---|
| JP | S59-131806 | U | 9/1984 |
| JP | H06-16012 | U | 3/1994 |
| JP | H07-124809 | A | 5/1995 |
| JP | H09-66411 | A | 3/1997 |
| JP | 2002-239823 | A | 8/2002 |
| JP | 2006-321024 | A | 11/2006 |
| JP | 2008-116259 | A1 | 5/2008 |
| JP | 2010-280015 | A | 12/2010 |
| WO | 1997/031743 | A1 | 9/1997 |
| WO | 2009/015488 | A1 | 2/2009 |

OTHER PUBLICATIONS

Exhibit 2006 (Declaration of Joseph Thomas Novak dated Mar. 15, 2016), filed in Inter Partes Review No. IPR2015-01462 on Mar. 15, 2016.
Exhibit 2007 (Curriculum Vitae (CV) of Joseph Thomas Novak), filed in Inter Partes Review No. IPR2015-01461 on Mar. 15, 2016.
Exhibit 2007 (Curriculum Vitae (CV) of Joseph Thomas Novak), filed in Inter Partes Review No. IPR2015-01462 on Mar. 15, 2016.
Exhibit 2008 (Declaration of Matthew K. Lacroix dated Mar. 15, 2016), filed in Inter Partes Review No. IPR2015-01461 on Mar. 15, 2016.
Exhibit 2008 (Declaration of Matthew K. Lacroix dated Mar. 15, 2016), filed in Inter Partes Review No. IPR2015-01462 on Mar. 15, 2016.
Exhibit 2009 (Attachment to Declaration of Matthew K. Lacroix), filed in Inter Partes Review No. IPR2015-01461 on Mar. 15, 2016.
Exhibit 2009 (Attachment to Declaration of Matthew K. Lacroix), filed in Inter Partes Review No. IPR2015-01462 on Mar. 15, 2016.
Exhibit 2010 (Attorney annotated comparison of Figure 4 of the '554 patent and Figure 2 from Redford), filed in Inter Partes Review No. IPR2015-01461 on Mar. 15, 2016.
Exhibit 2010 (Attorney annotated comparison of Figure 4 of the '554 patent and Figure 2 from Redford), filed in Inter Partes Review No. IPR2015-01462 on Mar. 15, 2016.
Exhibit 2011 (White Paper entitled "LENOX Bi-Metal SPEED-SLOTTM Hole Saw Up to 2X Life in Metal"), filed in Inter Partes Review No. IPR2015-01461 on Mar. 15, 2016.
Exhibit 2011 (White Paper entitled "LENOX Bi-Metal SPEED-SLOTTM Hole Saw Up to 2X Life in Metal"), filed in Inter Partes Review No. IPR2015-01462 on Mar. 15, 2016.
Exhibit 2012 (Patent Owner's Demonstratives for Oral Hearing), filed in Inter Partes Review No. IPR2015-01461 on Aug. 24, 2016.
Exhibit 2012 (Patent Owner's Demonstratives for Oral Hearing), filed in Inter Partes Review No. IPR2015-01462 on Aug. 24, 2016.
Final Written Decision issued in Inter Partes Review No. IPR2015-01461 on Sep. 29, 2016.
Final Written Decision issued in Inter Partes Review No. IPR2015-01462 on Sep. 29, 2016.
Patent owner's Motion to Exclude Evidence Under 37 C.F.R. 42.64 filed in Inter Partes Review No. IPR2015-01461 on Jul. 22, 2016.
Patent Owner's Motion to Exclude Evidence Under 37 C.F.R. 42.64 filed in Inter Partes Review No. IPR2015-01462 on Jul. 22, 2016.
Patent Owner's Exhibit List filed in Inter Partes Review No. IPR2015-01461 on Mar. 15, 2016.
Patent Owner's Exhibit List filed in Inter Partes Review No. IPR2015-01462 on Mar. 15, 2016.
Patent Owner's Exhibit List filed in Inter Partes Review No. IPR2015-01461 on Aug. 24, 2016.
Patent Owner's Exhibit List filed in Inter Partes Review No. IPR2015-01462 on Aug. 24, 2016.
Patent Owner's Notice of Withdrawal of Portions if Its Motion to Exclude Evidence Under 37 C.F.R. 42.64 filed in Inter Partes Review No. IPR2015-01461 on Aug. 29, 2016.
Patent Owner's Notice of Withdrawal of Portions if Its Motion to Exclude Evidence Under 37 C.F.R. 42.64 filed in Inter Partes Review No. IPR2015-01462 on Aug. 29, 2016.
Patent Owner's Objections to Evidence Submitted with Petition filed in Inter Partes Review No. IPR2015-01461 on Dec. 14, 2015.
Patent Owner's Objections to Evidence Submitted with Petition filed in Inter Partes Review No. IPR2015-01462 on Dec. 14, 2015.
Patent Owner's Reply to Petitioners' Opposition to Patent Owner's Motion to Exclude Evidence filed in Inter Partes Review No. IPR2015-01461 on Aug. 12, 2016.
Patent Owner's Reply to Petitioners' Opposition to Patent Owner's Motion to Exclude Evidence filed in Inter Partes Review No. IPR2015-01462 on Aug. 12, 2016.
Patent Owner's Response filed in Inter Partes Review No. IPR2015-01461 on Mar. 15, 2016.
Patent Owner's Response filed in Inter Partes Review No. IPR2015-01462 on Mar. 15, 2016.
Patent Owner's Supplemental Objections to Evidence Submitted with Petition filed in Inter Partes Review No. IPR2015-01461 on Feb. 26, 2016.
Patent Owner's Supplemental Objections to Evidence Submitted with Petition filed in Inter Partes Review No. IPR2015-01462 on Feb. 26, 2016.
Petition for Inter Partes Review of U.S. Pat. No. 8,579,554 Under U.S.C. 311-319 filed in Inter Partes Review No. IPR2015-01461 on Jun. 22, 2015.
Petition for Inter Partes Review of U.S. Pat. No. 8,579,555 Under U.S.C. 311-319 filed in Inter Partes Review No. IPR2015-01462 on Jun. 22, 2015.
Petitioners' Exhibit List filed in Inter Partes Review No. IPR2015-01461 on Jun. 15, 2016.
Petitioners' Exhibit List filed in Inter Partes Review No. IPR2015-01461 on Aug. 5, 2016.
Petitioners' Exhibit List filed in Inter Partes Review No. IPR2015-01462 on Jun. 15, 2016.
Petitioners' Exhibit List filed in Inter Partes Review No. IPR2015-01462 on Aug. 5, 2016.
Petitioners' Opposition to Patent Owner's Motion to Exclude Evidence filed in Inter Partes Review No. IPR2015-01461 on Aug. 5, 2016.
Petitioners' Opposition to Patent Owner's Motion to Exclude Evidence filed in Inter Partes Review No. IPR2015-01462 on Aug. 5, 2016.
Petitioners' Reply filed in Inter Partes Review No. IPR2015-01461 on Jun. 15, 2016.
Petitioners' Reply filed in Inter Partes Review No. IPR2015-01462 on Jun. 15, 2016.
Petitioner's Request for Rehearing Under 37 C.F.R. 42.71(d) filed in Inter Partes Review No. IPR2015-01462 on Dec. 9, 2015.
Extended European Search Report issued in EP application No. 11733410.2, dated Mar. 19, 2014, 6 pages.
Communication issued in EP application No. 11733410.2, dated Nov. 23, 2016, 5 pages.
International Search Report and Written Opinion of the International Searching Authority for International Application No. PCT/US2011/021217, dated Mar. 9, 2011, 10 pages.
International Search Report and Written Opinion for International Application No. PCT/US2011/021219, dated Apr. 26, 2011, 9 pages.
Office Action issued in U.S. Appl. No. 12/687,065 dated Mar. 5, 2013, 11 pages.
William Henry B04 Pikatti Knife 2005 Available at: http://www.onlyfineknives.com/ knife.php?k=224451 Accessed Nov. 6, 2008.
Bi-Metal Hole Saw 825-2 Package Greenlee Textron Inc. Rockford, Illinois 2003.
Flexible Bi-Metal Hacksaw Blade H888 2008 Available at http://www.alibaba.com-products/210815366/Flexible_bi_metal_hacksaw_blade_ H888.html Accessed Nov. 6, 2008.
Japanese Office Action issued in application No. 2012-549101, dated Dec. 2, 2014, 3 pages.
Office Action issued in U.S. Appl. No. 12/687,078 dated Apr. 11, 2016.
Office Action issued in U.S. Appl. No. 12/687,078 dated Dec. 18, 2012.
Decision—Institution of Inter Partes Review issued in Inter Partes Review No. IPR2015-01461 on Nov. 30, 2015.

(56) References Cited

OTHER PUBLICATIONS

Decision—Institution of Inter Partes Review issued in Inter Partes Review No. IPR2015-01462 on Nov. 30, 2015.
Decision—Request for Rehearing issued in Inter Partes Review No. IPR2015-01462 on Jan. 15, 2016.
Exhibit 1002 (Declaration of James Pangerc) filed in Inter Partes Review No. IPR2015-01461 on Jun. 22, 2015.
Exhibit 1002 (Declaration of James Pangerc) filed in Inter Partes Review No. IPR2015-01462 on Jun. 22, 2015.
Exhibit 1006 (Webster's Dictionary Page) filed in Inter Partes Review No. IPR2015-01461 on Jun. 22, 2015.
Exhibit 1006 (Webster's Dictionary Page) filed in Inter Partes Review No. IPR2015-01462 on Jun. 22, 2015.
Exhibit 1007 (Office Action issued in U.S. Appl. No. 12/687,065 dated Mar. 5, 2013) filed in Inter Partes Review No. IPR2015-01461 on Jun. 22, 2015.
Exhibit 1007 (Office Action issued in U.S. Appl. No. 13/006,080 dated Mar. 5, 2013) filed in Inter Partes Review No. IPR2015-01462 on Jun. 22, 2015.
Exhibit 1008 (Deposition Transcript of Glenn Vallee) filed in Inter Partes Review No. IPR2015-U1461 on Jun. 15, 2016.
Exhibit 1008 (Deposition Transcript of Glenn Vallee) filed in Inter Partes Review No. IPR2015-U1462 on Jun. 15, 2016.
Exhibit 1009 (Deposition Transcript of Joseph T. Novak) filed in Inter Partes Review No. IPR2015-01461 on Jun. 15, 2016.
Exhibit 1009 (Deposition Transcript of Joseph T. Novak) filed in Inter Partes Review No. IPR2015-01462 on Jun. 15, 2016.
Exhibit 1010 (Declaration of Andrew Dufresne) filed in Inter Partes Review No. IPR2015-01461 on Jun. 15, 2016.
Exhibit 1010 (Declaration of Andrew Dufresne) filed in Inter Partes Review No. IPR2015-01462 on Jun. 15, 2016.
Exhibit 1011 (Printed lenoxtools.com Webpage describing LENOX DiamondTM Hole Saws) filed in Inter Partes Review No. IPR2015-01461 on Jun. 15, 2016.
Exhibit 1011 (Printed lenoxtools.com Webpage describing LENOX DiamondTM Hole Saws) filed in Inter Partes Review No. IPR2015-01462 on Jun. 15, 2016.
Exhibit 1012 (Printed lenoxtools.com Webpage describing LENOX Carbide Tipped Hole Saws) filed in Inter Partes Review No. IPR2015-01461 on Jun. 15, 2016.
Exhibit 1012 (Printed lenoxtools.com Webpage describing LENOX Carbide Tipped Hole Saws) filed in Inter Partes Review No. IPR2015-01462 on Jun. 15, 2016.
Exhibit 1013 (Printed lenoxtools.com Webpage describing LENOX Carbide Grit Hole Saws) filed in Inter Partes Review No. IPR2015-01461 on Jun. 15, 2016.
Exhibit 1013 (Printed lenoxtools.com Webpage describing LENOX Carbide Grit Hole Saws) filed in Inter Review No. IPR2015-01462 on Jun. 15, 2016.
Exhibit 1014 (Printed lenoxtools.com Webpage describing LENOX One Tooth(R) Rough Wood Hole Cutter) filed in Inter Partes Review No. IPR2015-01461 on Jun. 15, 2016.
Exhibit 1014 (Printed lenoxtools.com Webpage describing LENOX One Tooth(R) Rough Wood Hole Cutter) filed in Inter Partes Review No. IPR2015-01462 on Jun. 15, 2016.
Exhibit 1015 (Printed lenoxtools.com Webpage describing LENOX Carbide Grit Recessed Lighting Hole Saws) filed in Inter Partes Review No. IPR2015-01461 on Jun. 15, 2016.
Exhibit 1015 (Printed lenoxtools.com Webpage describing LENOX Carbide Grit Recessed Lighting Hole Saws) filed in Inter Partes Review No. IPR2015-01462 on Jun. 15, 2016.
Exhibit 1016 (Declaration of Andrew Dufresne) filed in Inter Partes Review No. IPR2015-01461 on Aug. 5, 2016.
Exhibit 1016 (Declaration of Andrew Dufresne) filed in Inter Partes Review No. IPR2015-01462 on Aug. 5, 2016.
Exhibit 1017 (Printed E-mail from Counsel for Petitioners to Counsel for Patent Owner) filed in Inter Partes Review No. IPR2015-01461 on Aug. 5, 2016.
Exhibit 1017 (Printed E-mail from Counsel for Petitioners to Counsel for Patent Owner) filed in Inter Partes Review No. IPR2015-01462 on Aug. 5, 2016.
Exhibit 1018 (Petitioners' Demonstrative Exhibit for Oral Hearing) filed in Inter Partes Review No. IPR2015-01461 on Aug. 24, 2016.
Exhibit 1018 (Petitioners' Demonstrative Exhibit for Oral Hearing) filed in Inter Partes Review No. IPR2015-01462 on Aug. 24, 2016.
Exhibit 2002 (Response to Non-Final Office Action filed in U.S. Appl. No. 12/687,065 dated Jul. 5, 2013) filed in Inter Partes Review No. IPR2015-01461 on Mar. 15, 2016.
Exhibit 2002 (Response to Non-Final Office Action filed in U.S. Appl. No. 13/006,080 dated Jul. 5, 2013) filed in Inter Partes Review No. IPR2015-01462 on Mar. 15, 2016.
Exhibit 2003 (Deposition Transcript from Cross-Examination of James Pangerc taken on Feb. 19, 2016) filed in Inter Partes Review No. IPR2015-01461 on Mar. 15, 2016.
Exhibit 2003 (Deposition Transcript from Cross-Examination of James Pangerc taken on Feb. 19, 2016) filed in Inter Partes Review No. IPR2015-01462 on Mar. 15, 2016.
Exhibit 2004 (Declaration of Glenn E. Vallee dated Mar. 15, 2016), filed in Inter Partes Review No. IPR2015-01461 on Mar. 15, 2016.
Exhibit 2004 (Declaration of Glenn E. Vallee dated Mar. 15, 2016), filed in Inter Partes Review No. IPR2015-01462 on Mar. 15, 2016.
Exhibit 2005 (Curriculum Vitae (CV) of Glenn E. Vallee), filed in Inter Partes Review No. IPR2015-01461 on Mar. 15, 2016.
Exhibit 2005 (Curriculum Vitae (CV) of Glenn E. Vallee), filed in Inter Partes Review No. IPR2015-01462 on Mar. 15, 2016.
Claim chart of original independent claim 9 of U.S. Appl. No. 15/585,982, Jun. 2018.

\* cited by examiner

HOLE CUTTER WITH MULTIPLE FULCRUMS

RELATED APPLICATIONS

This application is a continuation-in-part of and claims priority under 35 U.S.C. § 120 to co-pending U.S. patent application Ser. No. 15/585,982, filed on May 3, 2017, titled "Hole Cutter with Multiple Fulcrums", which is a continuation of co-pending U.S. patent application Ser. No. 14/708,596, filed on May 11, 2015, titled "Hole Cutter with Multiple Fulcrums", which is a continuation of U.S. patent application Ser. No. 29/496,442, filed Jul. 14, 2014, titled "Hole Saw", which is a divisional of U.S. patent application Ser. No. 29/465,441, filed Aug. 28, 2013, now U.S. Pat. No. D711,441, issued Aug. 19, 2014, titled "Hole Saw," which is a divisional of U.S. patent application Ser. No. 29/417,810, filed Apr. 9, 2012, now U.S. Pat. No. D692,470, issued Oct. 29, 2013, titled "Hole Saw", which is a continuation of the following applications: U.S. patent application Ser. No. 29/353,762, filed Jan. 13, 2010, now U.S. Pat. No. D690,334, issued Sep. 24, 2013, titled "Hole Saw"; U.S. patent application Ser. No. 29/353,759, filed Jan. 13, 2010, now U.S. Pat. No. D659,176, issued May 8, 2012, titled "Hole Saw"; co-pending U.S. patent application Ser. No. 13/006,117, filed Jan. 13, 2011, titled "Hole Cutter with Chip Egress Aperture," which is a continuation-in-part of U.S. patent application Ser. No. 12/687,078, filed Jan. 13, 2010, titled "Hole Cutter with Chip Egress Aperture"; and U.S. patent application Ser. No. 13/006,080, filed Jan. 13, 2011, now U.S. Pat. No. 8,579,555, issued Nov. 12, 2013, titled "Hole Cutter with Axially-Elongated Aperture Defining Multiple Fulcrums", which is a continuation-in-part of U.S. patent application Ser. No. 12/687,065 filed Jan. 13, 2010, now U.S. Pat. No. 8,579,554, issued Nov. 12, 2013, titled "Hole Cutter with Axially-Elongated Aperture Defining Multiple Fulcrums," the entire contents of each of which are hereby expressly incorporated herein by reference as part of this application for all purposes. This application also claims priority under 35 U.S.C. § 120 to U.S. patent application Ser. No. 15/254,926 filed on Sep. 1, 2016, and titled "Hole Cutter with Multiple Fulcrums," which claimed the benefit of and priority to U.S. Provisional Patent Application No. 62/213,764 filed Sep. 3, 2015, and titled "Hole Cutter with Multiple Fulcrums," the entire contents of each of which are hereby expressly incorporated herein by reference as part of this application for all purposes.

TECHNICAL FIELD

The present disclosure relates generally to hole cutters, hole saws, or cup saws, and more particularly, to hole cutters with multiple fulcrums in their side walls to provide a mechanism for removing work piece slugs from the interior of the hole cutter.

BACKGROUND

A hole cutter, hole saw, or cup saw, is a type of cutter used in drilling circular holes in various materials, such as wood, metal, drywall, etc. A hole cutter typically has a substantially cylindrical body that defines a side wall and a hollow interior within the side wall, a circular cutting edge with multiple teeth located at one end of the body that are designed to cut a work piece during rotation of the cutter, and a cap located at the end of the body opposite the cutting edge for attaching the hole cutter to a driving device, such as a drill or other motorized device. The cap typically includes threads, holes or other structure adapted to allow the hole cutter to be drivingly connected to a drill, such as through an arbor. In use, the circular cutting edge can create a circular hole in a work piece and, in turn, can remove a circular work piece slug therefrom. Typically, after the hole is cut in the work piece, the work piece slug is retained within the hollow interior of the hole cutter and must be removed therefrom prior to cutting another hole.

Some conventional hole cutters can include apertures or slots formed in the side walls of the hole cutters that allow users to insert a lever, such as a screw driver, through the side wall and into the interior of the hole cutter to, in turn, lever or otherwise urge the slug out of the hole cutter. This slug removal task can be time-consuming and take substantial effort on the part of the user. A slug may be difficult to extract from within the body of a cutter, even with a hole cutter that includes slug removal apertures or slots, because the slug can become tightly wedged in the cutter or because the slug removal apertures or slots are not aligned with the slug. For example, a slug may become warped or cracked and thus, firmly lodged within the hole cutter. As another example, some work pieces, such as certain wood or wood-based products, contain saps or other sticky or glue-like residue that inhibits slug removal.

In addition, thicker and thinner work pieces can create slugs of differing thicknesses and slugs positioned at different locations within the hollow interior of the hole cutter. For example, a thick work piece can create a thick slug that can be pushed deep into the hollow interior of the hole cutter, whereas a thin work piece can create a thin slug located within the hollow interior of the hole cutter near the cutting edge. Accordingly, slugs often do not simply "pop" out of the cutter when worked by a tool. Slugs often slide short distances, twist, tilt, or otherwise gradually or incrementally move along the hollow interior of the hole cutter. The apertures in the side walls of conventional hole cutters can be relatively short in length or in respect to the vertical distance between the cutting edge and the cap, and therefore may be used only to remove either relatively thin or relatively thick work piece slugs, but not both types of slugs, and possibly not slugs of medium thicknesses. Further, the relatively short vertical length of these apertures may allow for moving of the slug through a certain portion of the hollow interior of the hole cutter but not through the entirety of the hollow interior and out of the hole cutter at the cutting edge. Other conventional hole cutters have multiple apertures that are axially and angularly spaced relative to each other, wherein each aperture is relatively short in length. U.S. Pat. Nos. 8,579,554 and 8,579,555, which are incorporated herein by reference, show hole cutters with apertures in their sidewalls with multiple fulcrums.

BRIEF DESCRIPTION OF THE DRAWINGS

For a more complete understanding of the present disclosure and certain features thereof, reference is now made to the following description, in conjunction with the accompanying figures briefly described as follows.

DETAILED DESCRIPTION OF EXAMPLE EMBODIMENTS

Figure 1:
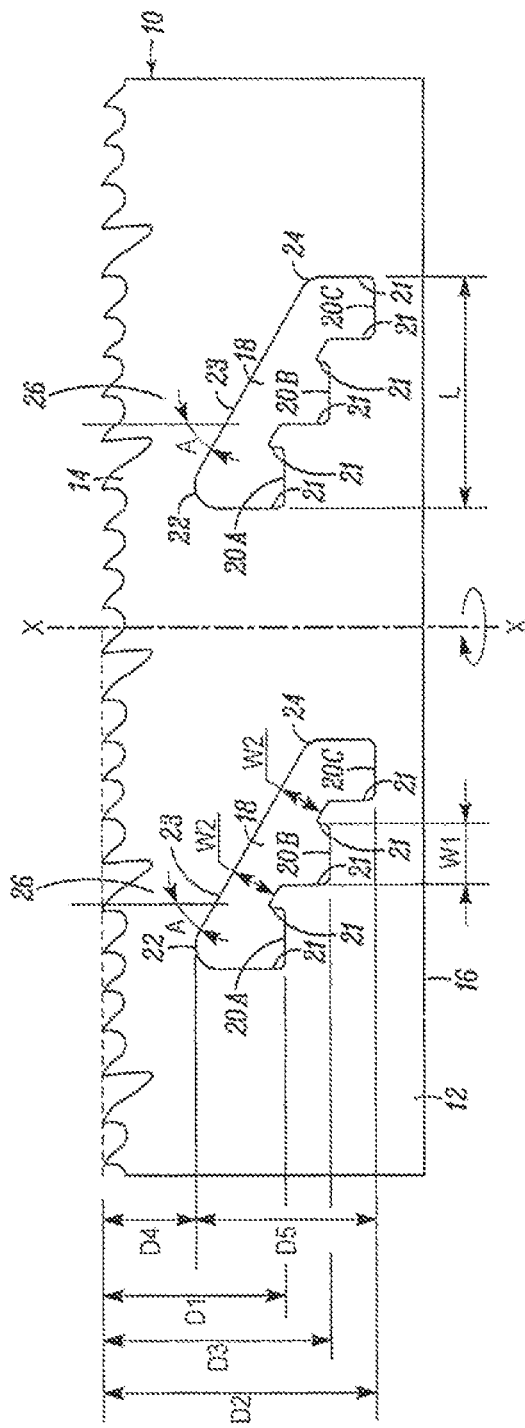
FIG. 1 is a side elevational view of a hole cutter blade prior to being formed into a cylindrical blade body shape according to one example embodiment of the disclosure.

Example embodiments of the invention now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

Certain dimensions and features of the example hole cutters are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the hole cutter and between features of the hole cutter are described herein using the term "substantially." As used herein, the term "substantially" indicates that each of the described dimensions is not a strict boundary or parameter and does not exclude functionally similar variations therefrom. Unless context or the description indicates otherwise, the use of the term "substantially" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Further, certain relationships between dimensions of the hole cutter and between features of the hole cutter are described herein using the term "substantially equal". As used herein, the term "substantially equal" indicates that the equal relationship is not a strict relationship and does not exclude functionally similar variations therefrom. Unless context or the description indicates otherwise, the use of the term "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

FIG. 1 is a side elevational view of a hole cutter blade prior to being formed into a cylindrical blade body shape according to one example embodiment of the disclosure. Now referring to FIG. 1, a blade body of a hole cutter is indicated generally by the reference numeral 10. The term "hole cutter," "hole saw," or "cup saw" is used here to mean a tool that cuts holes in work pieces, such as wood or metal work pieces. The example blade body 10 is shown in FIG. 1 in its flattened state. However, as will be recognized by those of ordinary skill in the pertinent art based on the teachings herein, during the manufacturing process for a hole cutter, the blade body 10 is rolled or otherwise formed into a substantially cylindrical shape to form the side walls of the hole cutter. The blade body 10 can include, when formed into the hole cutter, a side wall 12 that extends around an axis of rotation "X" of the hole cutter to define a substantially cylindrical blade body having a hollow interior. One end of the blade body can include a cutting edge 14. In certain example embodiments, at least a portion of the cutting edge 14 can be oriented substantially perpendicular to the axis of rotation X. The opposing end of the blade body can define a rim 16. A cap (not shown) can be fixedly secured to the rim 16 to enclose the respective end of the hole cutter. The end of the hole cutter opposite the cutting edge 14 and including the rim 16 and a cap (not shown) attached thereto is referred to herein as the "nonworking" end of the hole cutter. As recognized by those of ordinary skill in the pertinent art, the cap (not shown) may include one or more of a threaded hub and pin apertures so that the hole cutter can be coupled to, and driven by, an arbor drivingly connected to a power tool, such as an electric drill or other motorized device. As shown in FIG. 1, the example cutting edge 14 can be defined by, or otherwise include, multiple saw teeth with gullets extending between each tooth. However, as may be recognized by those of ordinary skill in the pertinent art based on the teachings herein, the cutting edge may alternatively be defined by, or otherwise include, any of a number of different tooth forms or other cutting edge forms that are currently known or that later become known. In one example embodiment, the blade body 10 is formed from sheet metal, however, any other type of metal, allow, or composite may be substituted for sheet metal. In certain example embodiments, the blade body 10 is rolled or otherwise formed into the cylindrical blade body 10 of the hole cutter and can be, in turn, welded or otherwise coupled to a cap. In other example embodiments, the hole cutter may be formed in any of a number of other ways that are currently known, or that later become known. For example, the end cap and side wall 12 may be a unitary apparatus spun, drawn, molded, or otherwise formed from a single piece of material.

The blade body 10 can include two axially-elongated apertures or slots 18 formed through the side wall 12 thereof and defining a passageway through the side wall 12 into a hollow interior of the hole cutter. In certain example embodiments, the two slots 18 can be angularly spaced relative to each other on the cylindrical blade body 10. In one example, as shown in FIG. 1, the two slots 18 are substantially equally spaced relative to each other (i.e., the two slots are spaced approximately 180° relative to each other). In various example embodiments, each slot 18 can have an axial depth D5 (D4−D2) ranging from approximately 1⅛ inches to approximately 1⅘ inches. In the illustrated embodiment of FIG. 1, each slot 18 has an axial depth D5 of approximately 1⅓ inches. In certain example embodiments, each slot 18 can have a circumferential length L ranging from approximately ⅔ inch to approximately 1⅘ inches. For example, as shown in FIG. 1, each slot 18 has a circumferential length L of approximately 1⅕ inches. As described in further detail below, each axially-elongated aperture or slot 18 can be configured to receive therethrough a lever from an outer side of the hole cutter into the hollow interior. In one example, the lever can be a device having a substantially straight, elongated member, such as a screw driver or Allen wrench, that can be used for removal of a work piece slug located within the hollow interior of the blade body 10.

In certain example embodiments, the number of axially-elongated apertures or slots 18 formed through the side wall 12 of the hole cutter can depend on the size of the hole cutter. For example, larger diameter hole cutters can typically include a greater number of axially-elongated apertures or slots 18 that can be formed through the cylindrical blade body 10. In some example embodiments, relatively small diameter hole cutters (e.g., approximately 9/16 inch diameter to approximately 13/16 inch diameter) may have one slot 18 oriented substantially parallel to the axis X of the hole cutter, larger diameter hole cutters may have two slots 18 (e.g., approximately ⅞ inch diameter to approximately 1 7/16 inches diameter) oriented substantially parallel to the axis X of the hole cutter, still larger diameter hole cutters (e.g., approximately 1½ inches diameter to approximately 3⅜ inches diameter) may have two larger area slots 18 that are oriented at acute angles relative to the axis X of the hole cutter, and still larger diameter hole cutters (e.g., approximately 3½ inches diameter to approximately 6 inches diameter) may have four larger area slots 18 oriented at acute angles relative to the axis X of the hole cutter. However, this is for example purposes only as any diameter hole cutter may have one or more slots 18 that can be oriented parallel to or at acute angle to the axis X of the hole cutter in other example embodiments. In some example embodiments in which hole cutters have multiple axially-extending slots 18, the axially-extending slots 18 can be substantially equally spaced relative to each other about the axis X of the hole cutter, (i.e., if there are two axially-extending slots 18 they are angularly spaced approximately 180° relative to each other, if there are three axially-extending slots 18 they are angularly spaced approximately 120° relative to each other, if there are four axially-extending slots 18 they are angularly spaced approximately 90° relative to each other, etc). However, as may be recognized by those of ordinary skill in the pertinent art based on the teachings herein, the axially-extending apertures or slots 18 need not be equally spaced relative to each other, nor do all axially-elongated apertures or slots 18 on the same hole cutter need to define the same aperture area or slot configuration.

In the example embodiment of FIG. 1, each axially-elongated aperture or slot 18 can include three fulcrums 20A, 20B and 20C axially and angularly spaced relative to each other. However, as may be recognized by those of ordinary skill in the pertinent art based on the teachings herein, the slot 18 may include fewer than three fulcrums, or more than three fulcrums. In one example, the fulcrums 20A, 20B and 20C are recessed edge surfaces of the side wall 12 of the blade body 10 that are formed on the edge of a respective axially-extending aperture or slot 18 that is adjacent to, or on the side of, the non-working end of the hole cutter. In the example embodiment of FIG. 1, the fulcrums 20A, 20B and 20C extend linearly or substantially linearly in a direction perpendicular or substantially perpendicular to the axis of rotation X of the hole cutter or parallel or substantially parallel to at least a portion of the cutting edge 14. Accordingly, a common tool, such as a screw driver or Allen wrench, can be inserted into the axially-extending aperture or slot 18, slipped into engagement with a respective fulcrum 20A, 20B or 20C, and manipulated as a lever against the respective fulcrum 20A, 20B or 20C to pry or push a slug out of the hollow interior of the blade body 10. Each fulcrum 20A, 20B and 20C has a width W1 that is sufficient to support a common tool or implement, such as the elongate shaft of an ordinary screw driver, e.g., a number 2 screw driver or Allen wrench. In one example embodiment, the recess of each fulcrum 20A, 20B and 20C can have a width W1 that is least approximately ¼ inch to allow insertion therein of a number 2 screw driver (which requires a width or clearance of approximately 0.27 inch) or Allen wrench, and can be within the range of approximately ¼ inch to approximately ⅓ inch. In the example of FIG. 1, the recessed surface of each fulcrum 20A, 20B, and 20C is oriented substantially parallel to the cutting edge 14, and is located on the side of the axially-extending aperture or slot 18 opposite the cutting edge 14. In addition, each fulcrum 20A, 20B and 20C is recessed within the respective side edge of the axially-extending aperture or slot 18 so that a side edge or lip 21 is formed at either end of the fulcrum 20A, 20B and 20C to facilitate retaining a tool within the fulcrum 20A, 20B and 20C when levered against it. Each lip or fulcrum side edge 21 can be oriented substantially normal to the cutting edge 14 or substantially parallel to the axis of rotation X of the hole cutter. In one example embodiment, the orientation and location of each fulcrum 20A, 20B and 20C can facilitate engagement of the fulcrum 20A, 20B and 20C by a tool and levering of the tool against the fulcrum 20A, 20B and 20C to pry or otherwise move a work piece slug out of the hollow interior of the blade body 10. Forming at least a portion of the fulcrum surface 20A, 20B and 20C substantially parallel to the cutting edge 14, and on the side of the axially-extending aperture or slot 18 opposite the cutting edge 14, can help in levering the tool against the side of the slug opposite the cutting edge 14 to force the slug out of the interior of the blade body 10.

As shown in FIG. 1, each slot 18 can also include a side edge 23 that is spaced opposite the fulcrums 20A, 20B and 20C. In one example, the side edge 23 can be spaced opposite the fulcrums 20A, 20B, and 20C by a minimum width W2 of the respective axially-extending slot 18 that is sufficient to allow a common tool, such as a number 2 screw driver or Allen wrench, to slide axially through the axially-extending slot 18 from one fulcrum 20A, 20B or 20C to another. The minimum width W2 can be at least approximately ¼ inch, such as within the range of approximately ¼ inch to approximately ⅓ inch. In one example, the width W2 is approximately 0.27 inch. Further, the side edge 23 of each axially-extending slot 18 can be substantially smooth and rectilinear in certain example embodiments to facilitate a sliding movement of a tool into and through the axially-extending slot 18 (e.g., from one fulcrum 20A, 20B, or 20C to another to progressively remove a slug) and to facilitate chip and/or dust egress from the hollow interior out of the hole cutter through the axially-extending slot 18. As may be recognized by those of ordinary skill in the pertinent art based on the teachings herein, the example configuration, orientation, location, and dimensions of each fulcrum 20A, 20B and 20C and axially-elongated aperture or slot 18 are only exemplary, and any of a number of other configurations, orientations, locations, and/or dimensions that are currently known, or that later become known, equally may be employed in other example embodiments.

Further, as shown in FIG. 1, the first fulcrum 20A can be axially spaced adjacent to and a first distance from the cutting edge 14, the second fulcrum 20C can be axially spaced a second distance greater than the first distance from the cutting edge 14 and adjacent to the rim 16 or non-working end of the hole cutter, and the third fulcrum 20B can be axially spaced a third distance that is greater than the first distance but less than the second distance and between the first and second fulcrums 20A and 20C. In one example embodiment, the first fulcrum 20A can be positioned at approximately one end of the axially-elongated aperture or slot 18, the second fulcrum 20C can be positioned at approximately a distal opposite end of the aperture or slot 18 relative to the first fulcrum 20A, and the third fulcrum 20B can be positioned approximately midway between the first fulcrum 20A and the second fulcrum 20C.

As shown in FIG. 1, the first fulcrum 20A can be axially spaced from the cutting edge 14 the first distance D1, which can be within the range of approximately ½ inch to approximately 1 inch, the second fulcrum 20C can be angularly spaced relative to the first fulcrum 20A and can be axially spaced from the cutting edge 14 the second distance D2, which can be within the range of approximately 1½ inches to approximately 2 inches, and the third fulcrum 20B can be angularly and axially spaced between the first and second fulcrums 20A and 20C and can be axially spaced from the cutting edge 14 the third distance D3, which can be within the range of approximately 1 inch to approximately 1½ inches. In the example embodiment of FIG. 1, the first distance D1 of the first fulcrum 20A can be configured for levering slugs having thicknesses of approximately ½ inch or less, the third distance D3 of the third fulcrum 20B can be configured for levering slugs having thicknesses of approximately 1 inch or less (e.g., a ¾ inch thick plywood slug), and the second distance D2 of the second fulcrum 20C can be configured for levering slugs having thicknesses of approximately 1½ inches or less (e.g., a 2 inch×4 inch slug). In the illustrated embodiment, the distances D1, D2 and D3 are measured from a plane defined by the cutting edge 14, such as a plane extending between the tips of unset or raker teeth disposed along the cutting edge. However, as may be recognized by those of ordinary skill in the pertinent art based on the teachings herein, the distances between the fulcrums 20A, 20B, and 20C and the cutting edge 14, or between other features of the hole cutter and the cutting edge 14, may be measured with respect to any of a number of other reference lines or features that are currently known or used, or that later become known or used, such as from the base of the deepest gullets of the cutting edge teeth.

In the operation of the hole cutter of FIG. 1, in order to remove, for example, a relatively thick slug (e.g., a 2 inch×4 inch slug) or a slug that has traveled deep into the hollow interior of the blade body 10, a user may insert a tool through one of the axially-extending slots 18, place the tip of the tool in contact with the side of the slug facing the cap (not shown) or the hollow interior of the blade body 10, select the second fulcrum 20C located axially furthest from the cutting edge 14 by placing a portion of the tool into contact with the fulcrum 20C, and apply a force (e.g., a rotational force about an axis defined by the fulcrum 20C) to a proximate portion of the tool to use the tool and the fulcrum 20C to lever the slug towards the cutting edge 14 and out of the hollow interior of the blade body 10. If the slug is not removed by levering the tool against the second fulcrum 20C, the user can reposition the tool against the third or middle fulcrum 20B that is located axially closer to the cutting edge 14 within the same axially-extending slot 18, and use that fulcrum to lever the slug further towards the cutting edge 14 and/or out of the hollow interior of the hole cutter. Similarly, if the slug is still not removed from the hollow interior of the blade body 10 by levering the tool against the third or middle fulcrum 20B, the user can again reposition the tool, without having to remove the tool from the respective axially-extending slot 18, against the first fulcrum 20A adjacent to the cutting edge 14, and use the first fulcrum 20A to lever the slug towards the cutting edge 14 and out of the hollow interior of the blade body 10. As can be seen from the description provided an in FIG. 1, each axially-extending slot 18 provides multiple fulcrums 20A, 20B and 20C that can be used to progressively lever or otherwise work a slug out of the hollow interior of the blade body 10 without having to remove the tool from the respective axially-extending slot 18.

As shown in FIG. 1, the fulcrums 20A, 20B and 20C can be both axially and angularly spaced relative to each other such that the fulcrum 20A disposed a first distance D1 from the cutting edge 14 is located at or substantially near a first end 22 of the axially-extending slot 18 closest to the cutting edge 14, the second fulcrum 20C is located a third distance D2 from the cutting edge 14 at or substantially near an opposite or second end 24 of the axially-extending slot 18, and the third fulcrum 20C is located a third distance D3 from the cutting edge that is between the first and second fulcrums 20A, 20C along the slot 14 and at a distance D3 that is between the first distance D1 and the second distance D2. In one example embodiment, the diameter of the hole cutter is sufficient to include two axially-extending slots 18 oriented at acute angles relative to the axis X of the hole cutter. In this example, each axially-extending slot 18, as shown in FIG. 1 is oriented at an acute angle "A" with respect to the axis X of the hole cutter. In some example embodiments, the angle A is at least approximately 30°, and can be anywhere within the range of approximately 35° to approximately 80°. In one example embodiment, the acute angle A is approximately 60°. As shown in the example of FIG. 1, each axially-extending slot 18 can slope away from the cutting edge 14 in a direction opposite the rotational cutting direction of the hole cutter. In certain example embodiments, the first end 22 of each axially-extending slot 18 is axially spaced from the cutting edge 14 a distance D4 within the range of approximately ¹⁵⁄₁₀₀ inch to approximately ⅜ inch. One advantage of this configuration is that the first or inlet end 22 of each axially-extending slot 18 is spaced closely adjacent to the cutting edge 14 to receive therefrom and therethrough the chips or dust generated at the cutting edge 14 during a cutting operation and, in turn, allow such chips or dust to egress from the hollow interior of the blade body 10 through the axially-extending slot 18 and away from the hollow interior of the blade body 10. Yet another advantage of this configuration is that the angular orientation of the axially-extending slots 18 improves the ability of the chips to flow up through the axially-extending slots 18 and away from the cutting edge 14 and hollow interior of the blade body 10 as the hole cutter is rotated during a cutting operation. A further advantage of the illustrated blade body 10 is that the first or inlet end 22 of each axially-extending slot 18 is axially spaced adjacent to the cutting edge 14 such that a solid or substantially solid annular portion 26 of the blade body 10 extends between the first or inlet end 22 of each axially-extending slot 18 and the cutting edge 14. This annular portion 26 of the blade body 10 advantageously provides the blade body 10 with sufficient strength to withstand the heat applied to the blade body 10 during the manufacturing of the hole cutter without distorting the blade body 10, and provides sufficient strength to the hole cutter to withstand the forces encountered during cutting operations. However, the annular portion 26 of the blade body 10 is sufficiently thin (as indicated above, D4 is within the range of approximately $15/100$ inch to approximately $3/8$ inch) to allow the chips and dust generated at the cutting edge 14 to flow into the axially-extending slots 18 and away from the hollow interior of the blade body 10.

Figure 2:
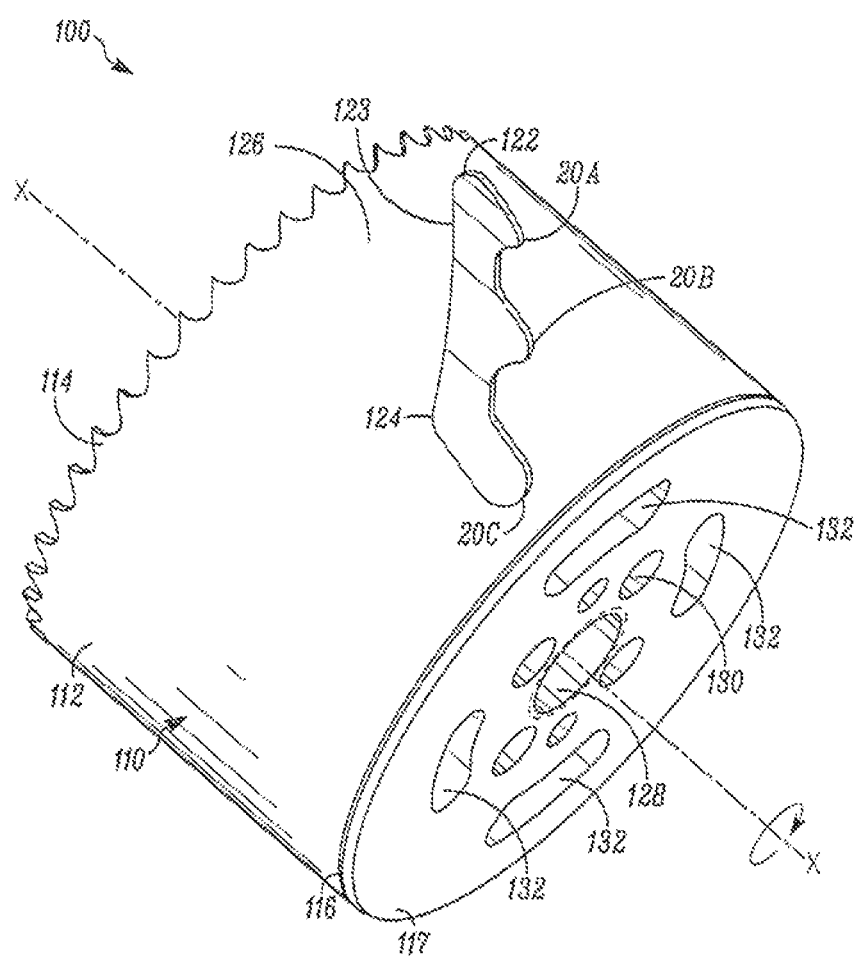
FIG. 2 is a perspective view of another configuration for a hole cutter according to one example embodiment of the disclosure.
Figure 3:
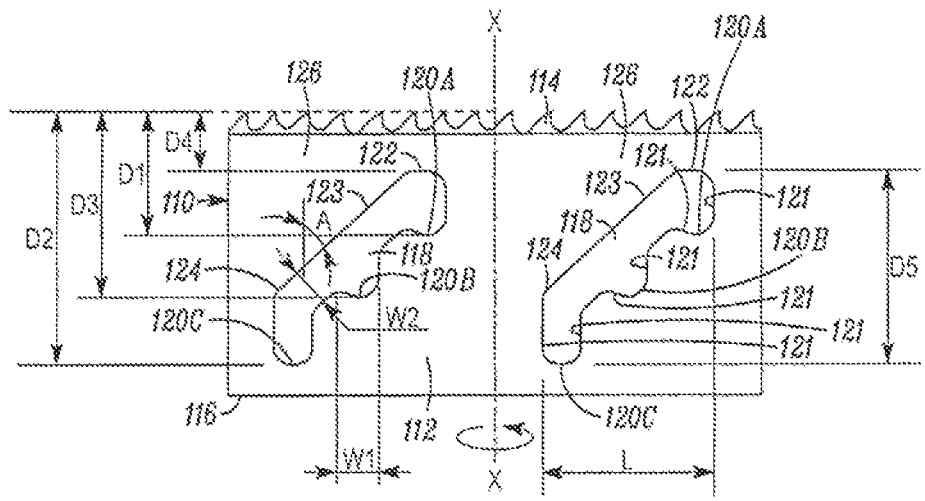
FIG. 3 is a side elevational view of the hole cutter blade of the hole cutter of FIG. 2 prior to being formed into a cylindrical blade body shape according to one example embodiment of the disclosure.

FIG. 2 is a perspective view of another configuration for a hole cutter according to one example embodiment of the disclosure. FIG. 3 is a side elevational view of the hole cutter blade of the hole cutter of FIG. 2 prior to being formed into a cylindrical blade body shape according to one example embodiment of the disclosure. Now referring to FIGS. 2 and 3, another example embodiment of a hole cutter is indicated generally by the reference numeral 100. The example hole cutter 100 can include a substantially cylindrical blade body 110 that is substantially the same as the blade body 10 described above in connection with FIG. 1. Accordingly the description provided with reference to FIG. 1 is incorporated herein except for the specific differences described below and like reference numerals preceded by the numeral "1" are used to indicate like but not necessarily the same elements as those shown in FIG. 1.

One example difference between the blade body 110 of FIGS. 2 and 3 and the blade body 10 describe in FIG. 1 is in the shape of the fulcrums 120A, 120B and 120C. As can be seen, the fulcrums 120A, 120B and 120C are defined by or otherwise include recessed curvilinear or radiused edges or surfaces of the axially-extending slots or apertures 118 that extend angularly in a direction parallel or substantially parallel to the cutting edge 114, as opposed to recessed linear edges or surfaces of the fulcrums 20A, 20B, and 20C of FIG. 1. As shown best in FIG. 3, the radiused fulcrums 120A, 120B, and 120C can extend angularly in a direction perpendicular or substantially perpendicular to the axis of rotation X of the cutter 100. Further, each radiused fulcrum 120A, 120B, and 120C, can be curved such that each fulcrum surface 120A, 120B and 120C initially extends in a direction away from the cutting edge 114, reaches an apex, and then curves in a direction back towards the cutting edge 114. Thus, the radiused fulcrums 120A, 120B and 120C can create gullet-like edges or surfaces wherein the deepest part of each gullet is closest to the rim 116 or non-working end of the hole cutter 100. In the same manner as described above in connection with the embodiment of FIG. 1, a tool, such as a standard Phillips number 2 screw driver or Allen wrench, can be placed into contact with the curvilinear fulcrums 120A, 120B and 120C, and pivoted about a respective fulcrum 120A, 120B or 120C to lever a slug out of the interior of the blade body 110. Therefore, the curved end of the fulcrums 120A, 120B and 120C may have a radius and/or the fulcrums 120A, 120B, and 120C may have a width W1 sufficient to receive therein a common tool or implement, such as the elongate shaft of a screw driver or Allen wrench. In certain example embodiments, the width W1 may be within the range of approximately ¼ inch to approximately ⅓ inch. The radiused nature of the ends of the fulcrums 120A, 120B and 120C is advantageous because the fulcrums 120A, 120B and 120C mimic the shape of common tools, such as the shaft of a screw driver. In addition, the curvilinear shape of the ends of each fulcrum 120A, 120B and 120C laterally supports a tool received within the fulcrum 120A, 120B or 120C to thereby prevent the tool from slipping, sliding, or otherwise becoming disengaged from the fulcrum 120A, 120B or 120C when levering a work piece slug. As may be recognized by those of ordinary skill in the pertinent art based on the teachings herein, the above-described fulcrum shapes and dimensions are only exemplary, and any of numerous other shapes and/or dimensions that are currently known, or that later become known, equally may be employed.

Another potential difference between the blade body 110 of FIGS. 2 and 3 and the blade body 10 describe above in FIG. 1 can be the angled orientation of the axially-extending slots or apertures 118. As shown in FIGS. 2 and 3, the axially-extending slots or apertures 118 of the blade body 110 can be set at a smaller acute angle with respect to the axis X of the blade body 110 as compared to the axially-extending slots or apertures 18 of the blade body 10 shown in FIG. 1. For example, the axially-extending slots or apertures 118 of the blade body 110 can be set at an acute angle with respect to the axis X of the blade body 110 of anywhere between approximately 20° and approximately 60°, and more preferably, the acute angle A can be approximately 47°.

As shown in FIG. 2, the hole cutter 100 can includes cap 117. The cap 117 can be welded or otherwise coupled to the rim 116 of the blade body 110 and can form a part of the non-working end of the hole cutter. In certain example embodiments, the cap 117 can include a central hub 128 defining a threaded aperture for threadedly coupling to an arbor. The cap 117 can also include one or more drive pin apertures 130. Each of the drive pin apertures 130 can provide a passageway through the cap 117 and into the hollow interior of the hole cutter. Further, in embodiments having more than one drive pin aperture 130, each drive pin aperture 130 can be substantially equally spaced relative to each other about the central hub 128 for engaging the drive pins of the arbor. In addition, the cap 117 can include one or more angularly-extending apertures 132. In embodiments having two angularly-extending apertures 132, for example, the angularly extending apertures 132 can be spaced approximately 180° apart on opposite sides of the hub 128 relative to each other. In one example embodiment, the angularly-extending apertures 132 are dimensioned and positioned to allow insertion therein of a tool, such as a screw driver or Allen wrench, into the hollow interior from an exterior of the hole cutter to further facilitate work piece slug removal.

Figure 4:
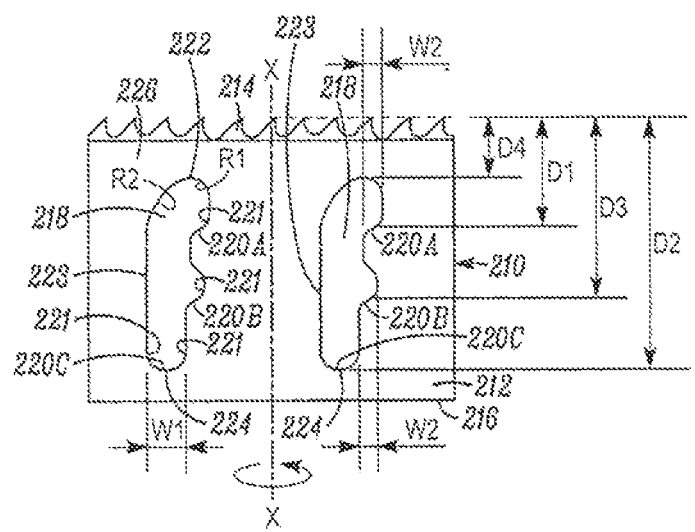
FIG. 4 is a side elevational view of another embodiment of a hole cutter blade that can be used for smaller diameter hole cutters and prior to being formed into a cylindrical blade body shape according to one example embodiment of the disclosure.

FIG. 4 is a side elevational view of another embodiment of a hole cutter blade that can be used for smaller diameter hole cutters and prior to being formed into a cylindrical blade body shape according to one example embodiment of the disclosure. Referring now to FIG. 4, another example embodiment of a hole cutter is indicated generally by the reference numeral 200. The hole cutter 200 can include a substantially cylindrical blade body 210 that is substantially the same as the blade bodies 10 and 110 described above in connection with FIGS. 1-3. Accordingly the description provided with reference to FIGS. 1-3 is incorporated herein except for the specific differences described below and like reference numerals preceded by the numeral "2", or preceded by the numeral "2" instead of the numeral "1", are used to indicate like, but not necessarily the same elements.

One example difference of the blade body 210 in comparison to the blade bodies 10, 110 described above in FIGS. 1-3 is that the axially-extending slots or apertures 218 are oriented parallel or substantially parallel to the axis of rotation X of the hole cutter 200. In one example embodiment, the blade body 210 forms a relatively small diameter hole cutter 200, and therefore, the axially-extending slots 218 may not define as large a slot area as the larger diameter hole cutters described above, and/or may not be oriented at acute angles relative to the axis of rotation X of the hole cutter 200. However, in alternate example embodiments, the same axially-extending slots or apertures may be provided in the blade body of any hole cutter having any diameter. In one example embodiment, the blade body 210 is used to form hole cutters defining blade body diameters within the range of approximately ⅞ inch to approximately 1 7/16 inches. In certain example embodiments, smaller diameter hole cutters (e.g., approximately 13/16 inches diameter or less) may include the same slot configuration 118 as illustrated in FIG. 3, but may include only one such slot 118 in the blade body 110.

Another optional difference of the blade body 210 to that of the blade bodies 10, 110 of FIGS. 1-3 is with regard to the shapes of the fulcrums 220A, 220B and 220C. As can be seen in FIG. 4, the first fulcrum 220A is defined by or otherwise include a curvilinear surface extending laterally or substantially laterally from the axially-extending slot 218 parallel or substantially parallel to the cutting edge 214, but sloping slightly away from the cutting edge 214 in a direction opposite to the rotational cutting direction of the blade 210 about the X axis. The first fulcrum 220A can include only one side edge 221 that is oriented parallel or substantially parallel to the axis of rotation X of the hole cutter. The third or middle fulcrum 220B can similarly defined by or otherwise include a curvilinear surface extending laterally or substantially laterally from the axially-extending slot 218 parallel or substantially parallel to the cutting edge 214, but sloping slightly away from the cutting edge 214 in a direction opposite to the rotational cutting direction of the blade 210 about the X axis. Like the first fulcrum 220A, the third or middle fulcrum 220B can include only one side edge 221 that is oriented parallel or substantially parallel to the axis of rotation X of the hole cutter 200, but is curvilinear rather than rectilinear. The second fulcrum 220C is defined by or otherwise includes the second end 224 of the axially-extending slot 218, and as can be seen, is can include a curvilinear surface extending parallel or substantially parallel to the rotational cutting direction of the blade 210 about the X axis, and two side surfaces 221 extending parallel or substantially parallel to the axis of rotation X of the blade 210 and formed by the respective side edges of the second end 224 of the axially-extending slot 218. In one example embodiment, the width W2 of each of the first fulcrums 220A and the third or middle fulcrums 220B may be within the range of approximately 2/10 inch to approximately ½ inch, such as within the range of approximately ¼ to approximately ⅜ inch. The first fulcrum 220A and the third or middle fulcrum 220B need not be as wide as the diameter of a number 2 screw driver, for example, because part of the screw driver shaft or Allen wrench can be received in the fulcrum 220A, 220B while another portion of the screw driver shaft or Allen wrench can extend into the adjacent portion of the axially-extending slot 218. The width W1 of the third fulcrum 220C may be at least approximately 0.27 inch to allow insertion therein of a number 2 screw driver or Allen wrench.

Another difference of the hole cutter 200 in comparison to the hole cutter 100 described above in FIGS. 2-3 is the configuration of the first or inlet end 222 of each axially-extending slot 218. In one example embodiment, the side edge 221 of the first fulcrum 220A can extend linearly or substantially linearly and parallel or substantially parallel to the axis of rotation X. The first or inlet end 222 of each axially-extending slot 218 can defined by or otherwise include two curvilinear regions. A first curvilinear region can be contiguous to the first fulcrum side edge 221 and have one or more relatively small radii R1, and a second curvilinear region can be contiguous to the side edge 223 and have one or more larger radii R2 and can be disposed on an opposite side of the axially-extending slot 218 relative to the first fulcrum side edge 221. The larger radius R2 can impart a shape to the respective edge of the axially-extending slot 218 that slopes away from the cutting edge 214 in a direction opposite the rotational cutting direction of the blade 210 about the X axis in certain example embodiments. In addition, the location of the first fulcrum 220A and the orientation of the respective side edge 221 oriented parallel or substantially parallel to the axis of rotation X can impart a relatively wide first end or entrance region 222 to the axially-extending slot 218 to facilitate the flow of chips or dust from the cutting edge 214 and hollow interior into the axially-extending slot 218 and out of the hole cutter. In certain example embodiments, the width at the inlet end 222 of the axially-extending slot 218 can be within the range of approximately 1¼ to approximately 1½ times the minimum width W1 or width at the outlet end 224 of the axially-extending slot 218, and can be at least approximately 1⅓ times the width W1.

Figure 5:
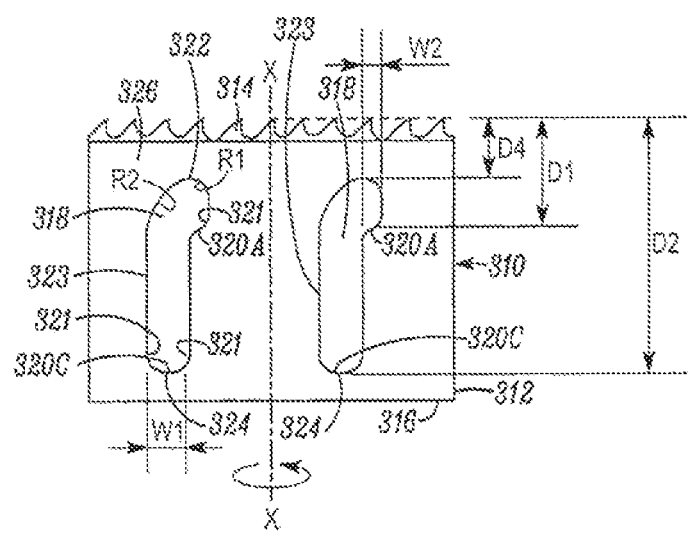
FIG. 5 is a side elevational view of another embodiment of a hole cutter blade that can be used for smaller diameter hole cutters and prior to being formed into a cylindrical blade body shape according to one example embodiment of the disclosure.

FIG. 5 is a side elevational view of another embodiment of a hole cutter blade 300 that can be used for smaller diameter hole cutters and prior to being formed into a cylindrical blade body shape according to one example embodiment of the disclosure. Now referring to FIG. 5, the hole cutter blade 300 includes a substantially cylindrical blade body 310 that is substantially the same as the blade body 210 described above in connection with FIG. 4. Accordingly the description provided with reference to FIGS. 1-4 is incorporated herein except for the specific differences described below and like reference numerals preceded by the numeral "3" instead of the numeral "2," are used to indicate like but not necessarily the same elements as those shown and described in FIG. 4.

One example difference of the blade body 310 in comparison to the blade body 210 described in connection with FIG. 4 is that the axially-extending slots or apertures 318 define or otherwise include two fulcrums 320A, 320C instead of three fulcrums. In certain example embodiments, the blade body 310 can be used to form hole cutters having blade body diameters within the range of approximately ⅞ inch to approximately 1 7/16 inches. Embodiments of smaller diameter hole cutters (e.g., approximately 13/16 inches diameter or less) can include the same slot configuration as illustrated in FIG. 5, but may optionally include only one such slot rather than two. However, in other example embodiments, the blade body and slot configurations of FIG. 5 can be used for a hole cutter having any diameter. In one example, the second fulcrum 320C can be axially spaced from the cutting edge 314 a distance D2, which can be within the range of approximately 1½ inches to approximately 2 inches. As noted above with regard to FIG. 4, the second fulcrum 320C being located in this range is advantageously configured for levering slugs from 2-by wood (e.g., 2 inch×4 inch, 2 inch×6 inch, 2 inch×8 inch, etc., as those dimensions are used within the lumber industry (e.g., 2 inch×4 inch wood typically has an actual dimension of approximately 1½ inch×3½ inches)), such as slugs of approximately 1 5/8 inches or less.

Figure 6:
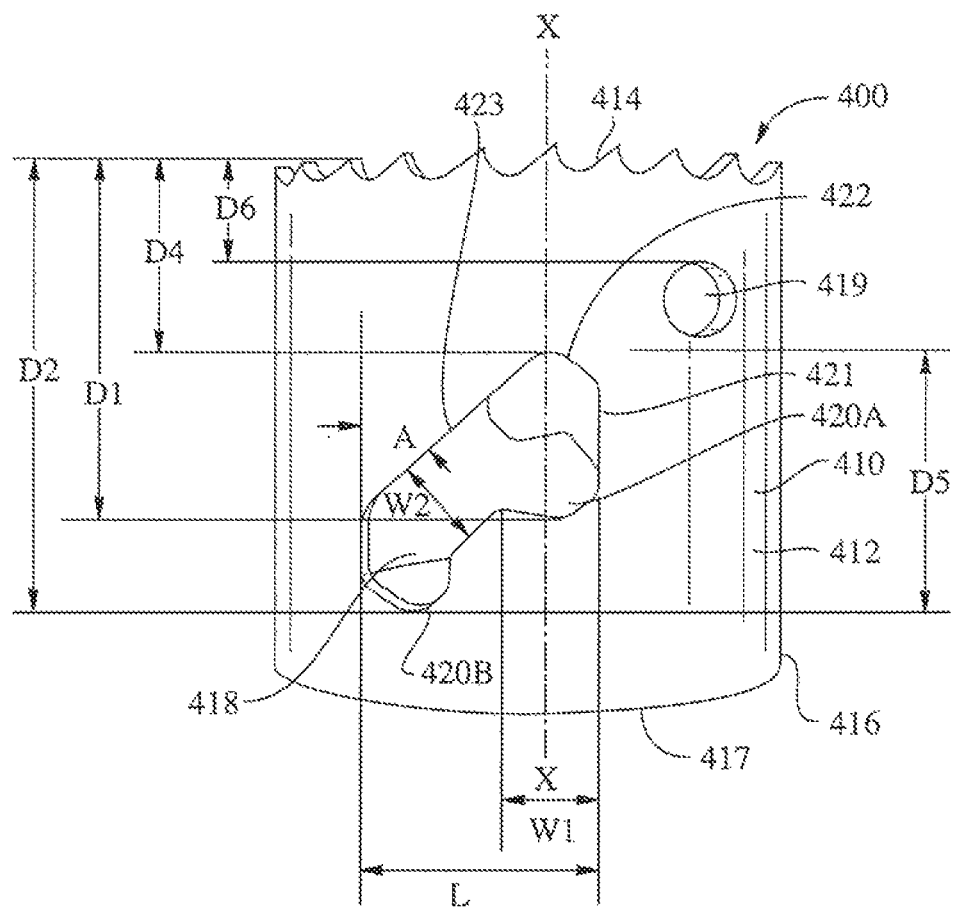
FIG. 6 is a front elevational view of another embodiment of a hole cutter according to one example embodiment of the disclosure.
Figure 7:
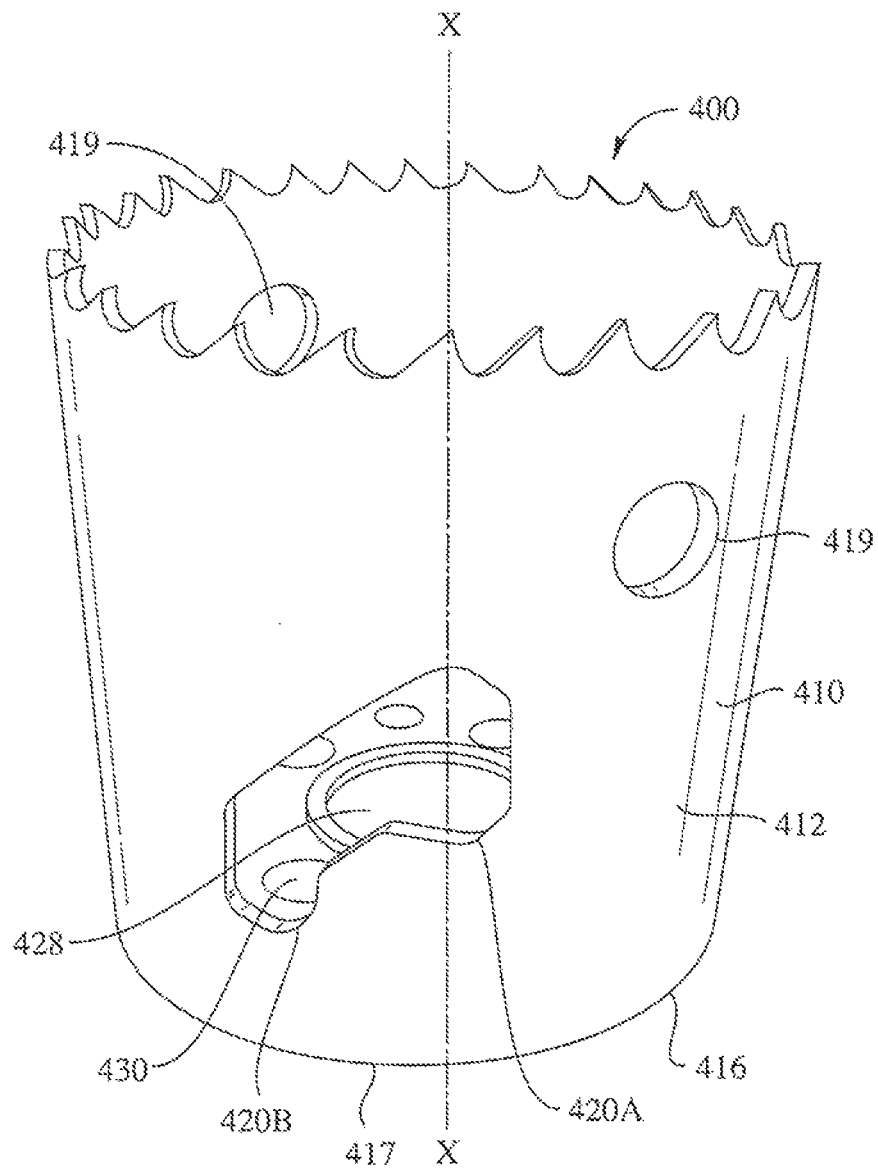
FIG. 7 is a front perspective view of the hole cutter of FIG. 6 according to one example embodiment of the disclosure.

FIG. 6 is a front elevational view of another embodiment of a hole cutter 400 according to one example embodiment of the disclosure. FIG. 7 is a front perspective view of the hole cutter 400 of FIG. 6 according to one example embodiment of the disclosure. Now referring to FIGS. 6 and 7, the hole cutter 400 can include a substantially cylindrical blade body 410 and can have features that are substantially the same as the blade body 110 described above in connection with FIGS. 2 and 3. Accordingly the description provided with reference to FIGS. 1-3 is incorporated herein except for the specific differences described below and therefore, like reference numerals preceded by the numeral "4" instead of the numeral "1," are used to indicate like but not necessarily the same elements as those shown and described in FIGS. 1-3.

The blade body 410 can include a side wall 412 that extends around an axis of rotation "X" of the hole cutter to define or otherwise create a substantially cylindrical blade body. One example difference of the blade body 410 in comparison to the blade bodies 10, 110 described in connection with FIGS. 1-3 is that the slots or apertures 418 define or otherwise include two fulcrums 420A and 420B. In addition, the blade body 410 includes another aperture or hole 419 that extends through the blade body 410 into the hollow interior of the hole cutter and that is separate or isolated from the aperture 418. In certain example embodiments, the fulcrums 420A and 420B each are defined by or otherwise include recessed curvilinear or radiused edges or surfaces of the axially-extending slots or apertures 418 that extend, at least in part, angularly in a direction parallel or substantially parallel to the cutting edge 414. In other example embodiments, the fulcrums 420A and 420B each are defined by or otherwise include linear edges or surfaces. As shown in FIG. 6, the example fulcrums 420A and 420B define or include portions that are generally angular in a direction perpendicular or substantially perpendicular to the axis of rotation X of the hole cutter 400 and are curved such that each fulcrum surface 420A and 420B initially extends in a direction away from the cutting edge 414, reaches an apex, and then curves in a direction back towards the cutting edge 414. In certain example embodiments, the end of each fulcrum 420A and 42B can be radiused to provide for this change of direction and apex. In this example, the radiused fulcrums 420A and 420B create gullet-like edges or surfaces wherein the deepest part of each gullet is closest to the rim 416 or non-working end of the hole cutter 400. Similarly, as described above in connection with the example embodiment of FIGS. 2 and 3, a tool, such as a standard Phillips number 2 screw driver or Allen wrench, can be placed into contact with the fulcrums 420A and 420B, and pivoted on or about a respective fulcrum 420A or 420B to lever a slug out of the interior of the blade body 410. Therefore, the ends of the fulcrums 420A and 420B may define or have a radius and/or width W1 sufficient to receive therein a common tool or implement, such as the elongate shaft of a screw driver or Allen wrench. In certain example embodiments, the width W1 may be within the range of approximately ¼ inch to approximately ⅓ inch and the radius may be half of that example amount. The radiused nature of the fulcrums 420A and 420B in the example embodiment of FIGS. 6 and 7 can mimic the shape of certain common tools, such as the shaft of a screw driver. In addition, the curvilinear shape of the end of each fulcrum 420A and 420B can help to laterally support a tool received within the fulcrum 420A or 420B to prevent the tool from slipping, sliding, or otherwise becoming disengaged from the fulcrum 420A or 420B when levering a work piece slug.

The example aperture 419 as shown in FIG. 6 is substantially circular. In one example embodiment, the aperture 419 has a diameter of approximately 0.24 inches (approximately 6 mm), and the outer edge of the aperture 419 acts as or otherwise defines at least one fulcrum or fulcrum surface for levering out slugs from the blade body 410. In other example embodiments, the hole can have a diameter greater or less than approximately 0.24 inches. This example diameter can permit a tool, such as a Phillips number 2 screw driver, Allen wrench, or other tool, to be inserted into the aperture 419 and used to pivot on the fulcrum surface(s) (e.g., the perimeter surface of the hole) to lever or force slugs out of the blade body 410. As those of ordinary skill in the art should appreciate, a circular or substantially circular hole, such as the aperture 419, is the strongest shape and can provide a large and possibly infinite number of leverage or fulcrum points along its edges(s) and thus, would be particularly useful to those using the saw blade to cut steel plate material. As should be recognized by those of ordinary skill in the pertinent art based on the teachings herein, the fulcrum shapes, fulcrum dimensions, and the hole diameters described herein are only exemplary, and any of a number of other shapes and/or dimensions that are currently known, or that later become known, equally may be employed. For example, the aperture 419 may be oval, square, square with rounded corners, rectangular, radiused or curved to provide at least one fulcrum surface.

The hole or aperture 419 through the side wall 412 of the blade body 410 may be located in any position on the saw blade body 410. In one example embodiment, the aperture 419 is located near the axially-elongated aperture 418, e.g., circumferentially spaced within approximately 45° to approximately 90° from the axially-elongated aperture 418. In such manner, a user can move a levering tool from aperture 418 to aperture 419 without having to turn the hole cutter 400. In the example embodiment of FIG. 6, the aperture 419 is shown as being positioned closer to the cutting edge 414 than the aperture 418. In one example, the distance D6 between the top of aperture 419 and the cutting edge 414 is shorter than any other distances such as D1, D2, and D4 from the cutting edge 414. For example, the distance D6 can be within the range of approximately 0.030 inch to approximately 0.050 inch, the distance D1 can be within the range of approximately 1.1 inches to approximately 1.4 inches, the distance D2 can be within the range of approximately 1.6 inches to approximately 1.85 inches, and the distance D4 can be within the range of approximately 0.8 inch to approximately 1.2 inches. In example embodiments where the aperture 419 is closer to the cutting edge 414 than the aperture 418, the aperture 419 may be used to lever a relatively thin slug from the body 410, or the third fulcrum defined by aperture 419 can be used to further lever a slug after using fulcrums 420B and/or 420A. Furthermore, distance D6 provides sufficient material between the aperture 419 and the cutting edge 414 to provide the hole cutter 400 with adequate strength and stiffness, even under levering forces. In one example embodiment, D6 is at least approximately 0.2 inches. In another example embodiment, D6 is within the range of approximately 0.3 inch and approximately 0.5 inch.

In certain example embodiments, as shown in FIG. 6, the aperture 419 can be angularly or circumferentially spaced or offset from the aperture 418. As shown in FIG. 6, the aperture 419 can be angularly spaced from aperture 418 in a direction of rotation of the hole cutter 400 defined by the cutting edge 414. In other example embodiments, the aperture 419 is angularly spaced from the first fulcrum 420A in a direction opposite the direction of rotation of the saw 400 defined by the cutting edge 414. In yet other example embodiments, the aperture 419 is substantially axially-aligned with the aperture 418, e.g., not angularly or circumferentially offset from the first fulcrum 420A.

The number of apertures 419 formed through the side wall 412 of the hole cutter 400 may vary. For example, as discussed above, the number of axially-elongated apertures 418 may vary based on the size of the hole cutter 400. The larger the diameter of the hole cutter 400, the greater is the number of axially-elongated apertures or slots 418 that may be formed through the cylindrical blade body 410. In some example embodiments, the number of apertures 419 may be equal to the number of slots 418. Thus, for example, relatively small diameter hole cutters 400 (e.g., approximately 9/16 inch diameter to approximately 13/16 inch diameter) may have one aperture 419, larger diameter hole cutters 400 (e.g., approximately 7/8 inch diameter to approximately 3½ inches diameter) may have two apertures, and still larger diameter hole cutters 400 (e.g., approximately 3½ inches diameter or greater) may have four apertures 419. In other example embodiments, the hole cutter 400 may have a different number of slots 418 and apertures 419.

In some example embodiments of the hole cutters having multiple axially-extending slots 418 and/or apertures 419, the axially-extending slots 418 and/or apertures 419 are approximately equally spaced relative to each other about the axis X of the hole cutter 400, e.g., if there are two axially-extending slots 418 or isolated apertures 419 they can be angularly spaced approximately 180° relative to each other, if there are three axially-extending slots 418 or isolated apertures 419 they can be angularly spaced approximately 120° relative to each other, if there are four axially-extending slots 418 or isolated apertures 419 they can be angularly spaced approximately 90° relative to each other, etc. However, as may be recognized by those of ordinary skill in the pertinent art based on the teachings herein, the axially-extending apertures or slots 418 or apertures 419 need not be equally spaced relative to each other, nor do all axially-elongated apertures or slots 418 on the same hole cutter need to define the same aperture area or slot configuration.

Figure 8:
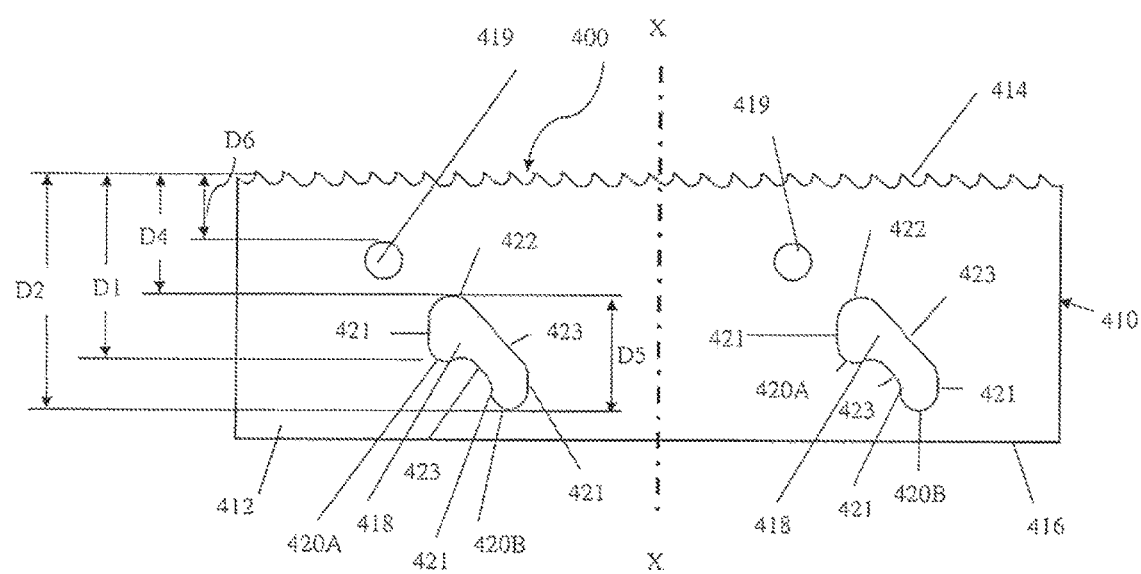
FIG. 8 is a side elevational view of the hole cutter blade of the hole cutter of FIG. 6 prior to being formed into a cylindrical blade body shape according to one example embodiment of the disclosure.

As shown in FIGS. 6-8, the axially-extending slots or aperture 418 through the blade body 410 can be at a similar angle with respect to the axis X of the blade body 410 as compared to the axially extending slots or apertures 118 through the blade body 110 shown in FIGS. 2 and 3. However, in other example embodiments, they may be at any angle, or no angle at all, i.e., extending substantially aligned with the axis X-X of the hole cutter 400.

As shown in FIGS. 6 and 7, the hole cutter 400 can include a cap 417 welded or otherwise coupled to the rim of the blade body 410 and forming a part of the non-working end of the hole cutter 400. The cap 417 includes a central hub 428 that includes a threaded aperture for threadedly engaging an arbor. The cap 417 can also include one or more drive pin apertures 430. In certain example embodiments, the drive pin apertures can be substantially equally spaced relative to each other about the central hub 428 and can be configured to slidably receive therein the drive pins of the arbor. The cap 417 can also include two or more angularly-extending apertures (not shown but in one example embodiment substantially similar to that shown and described with regard to element 132 of FIG. 2). In one example embodiment, the angularly-extending apertures can be spaced approximately 180° apart on opposite sides of the central hub 428 relative to each other. The angularly-extending apertures (not shown) can be dimensioned and positioned to allow insertion therein of a tool, such as a screw driver, to further facilitate in work piece slug removal.

FIG. 8 is a side elevational view of the hole cutter blade of the hole cutter of FIG. 6 prior to being formed into a cylindrical blade body shape according to one example embodiment of the disclosure. Referring now to FIG. 8, the blade body 410 is shown in a flat or substantially flat form prior to being formed into a cylindrical body shape. As should be recognized by those of ordinary skill in the pertinent art based on the teachings herein, the blade body 410 may be rolled or otherwise formed into a substantially cylindrical shape to form the hole cutter 400. As seen in FIG. 8, the blade body 410 can include two or more slots or apertures 418 each defining or otherwise including two fulcrums 420A and 420B. The blade body 410 can also include two or more apertures 419. In one example, each aperture 419 can be located relatively near to a respective slot 418 but can also be circumferentially spaced in a direction of rotation of the hole cutter 400 and axially offset toward the cutting edge 414. As seen in FIG. 8, in some example embodiments, the aperture 419 can be spaced a distance D6 from the cutting edge 414. In certain example embodiments, the distance D6 is less than a distance D4 that the aperture 418 is spaced from the cutting edge 414. It should be noted that while the example embodiment of the hole cutter 400 has two slots 418 and two apertures 419, in other example embodiments, a greater or less number of slots 418 and apertures 419 can be provided in the blade body 410 of the hole cutter 400.

Figure 9:
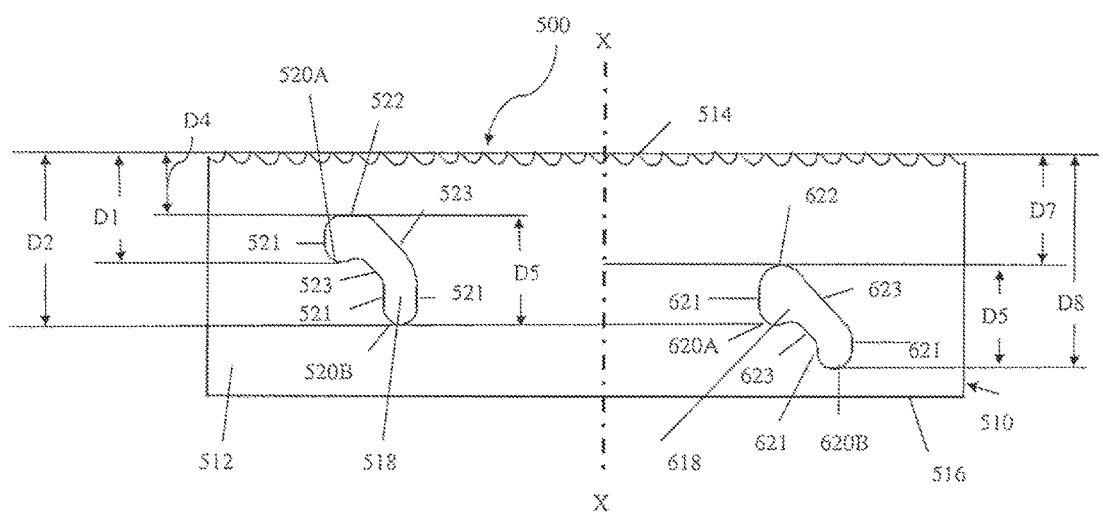
FIG. 9 is a side elevational view of another embodiment of a hole cutter blade prior to being formed into a cylindrical blade body shape according to one example embodiment of the disclosure.
Figure 10:
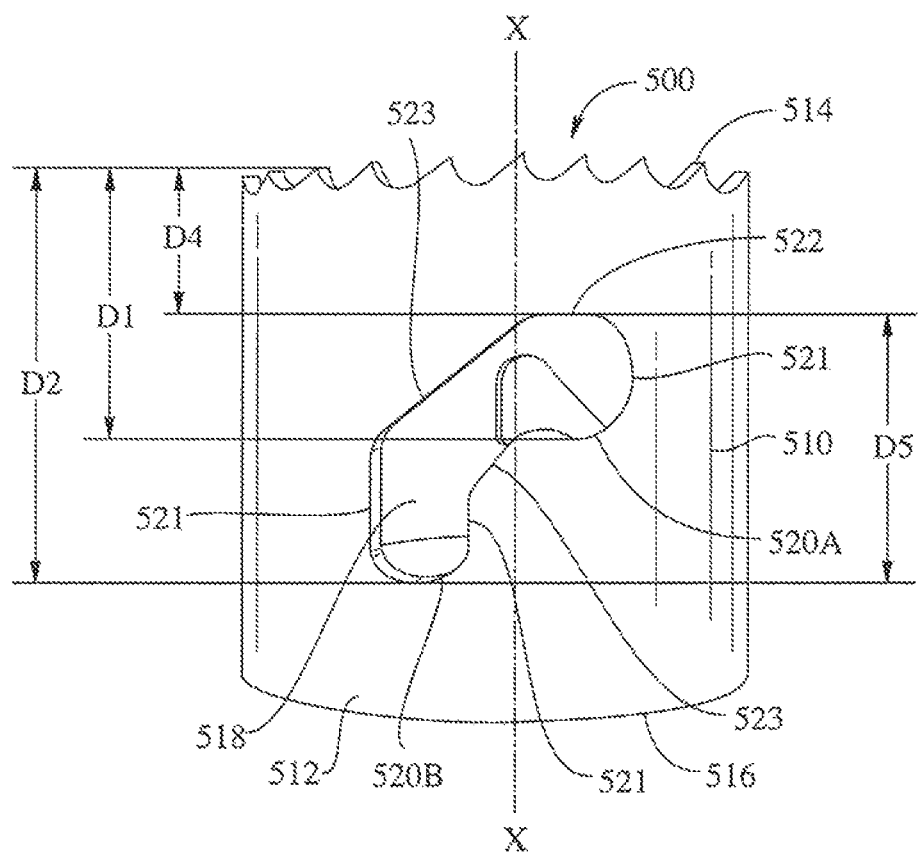
FIG. 10 is a front elevational view of a hole cutter having the hole cutter blade of FIG. 9 after being formed into a cylindrical body shape according to one example embodiment of the disclosure.
Figure 11:
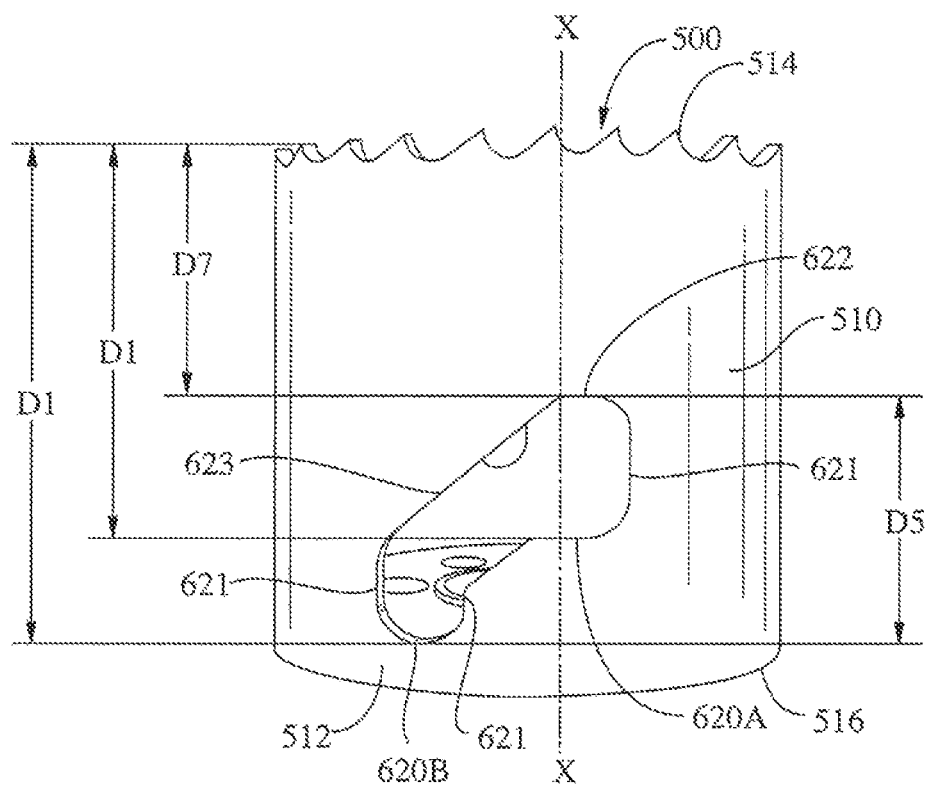
FIG. 11 is a rear elevational view of the hole cutter of FIG. 10 according to one example embodiment of the disclosure.

FIG. 9 is a side elevational view of another embodiment of a hole cutter blade body 510 prior to being formed into a cylindrical blade body shape according to one example embodiment of the disclosure. FIG. 10 is a front elevational view of a hole cutter 500 having the hole cutter blade body 510 of FIG. 9 after being formed into a cylindrical body shape according to one example embodiment of the disclosure. FIG. 11 is a rear elevational view of the hole cutter 500 of FIG. 10 according to one example embodiment of the disclosure. Now referring to FIGS. 9, 10, and 11, the blade body 510 is shown in FIG. 9 prior to being formed into a cylindrical body shape. As should be recognized by those of ordinary skill in the pertinent art based on the teachings herein, the blade body 510 may be rolled or otherwise formed into a substantially cylindrical shape to form the hole cutter 500. The example blade body 510 can include a side wall 512 that, when so formed, extends around an axis of rotation "X" of the hole cutter 500 to define a substantially cylindrical blade body 510. One end of the blade body 510 can include a cutting edge 514. In one example embodiment, the cutting edge can be oriented substantially perpendicular to the axis of rotation X. The opposing end of the blade body can defines a rim 516. The example hole cutter 500 can include the substantially cylindrical blade body 510 and have features that are substantially the same as the blade body 410 described above in connection with FIG. 8, and therefore, like reference numerals preceded by the numeral "5" instead of the numeral "4," are used to indicate like, but not necessarily the same elements. One example difference of the blade body 510 in comparison to the blade body 410 described in connection with FIG. 8 is that the blade body 510 can include two differently shaped slots or apertures 518 and 618 instead of two similarly shaped slots 418 as shown in the example embodiment of FIG. 8. In one example embodiment, the slot 618 of FIG. 9 may be similar in configuration, shape, and location to the slot 418 of FIG. 8. For example, the inlet end 522 of the slot 518 can have a different shape than the inlet end 622 of the slot 618. As can be seen in FIG. 9, the inlet end 522 of the slot 518 can extend substantially linearly and substantially parallel to the cutting edge 514 in one example embodiment. The inlet end 622 of the slot 618 defines or otherwise has a more curvilinear shape than that of the aperture 518 in certain example embodiments.

Another difference between the slot 618 and the slot 518 can be that the distance D4 (e.g., anywhere between approximately 0.3 inch to approximately 0.5 inch) between the slot 518 and the cutting edge 514 can be less than the distance D7 (e.g., anywhere in the range of approximately 0.8 inch to approximately 1.2 inches) between the slot 618 and the cutting edge 514. Further, the two side edges 521 can be longer than the corresponding two side edges 621, even though both the side edges 521 and 621 are substantially parallel to the axis of rotation X.

In the example embodiment shown in FIG. 9, the positioning slot 518 closer to the cutting edge 514 as compared to the slot 618 (distance D4 compared to distance D7) provides the blade body 510 with additional fulcrums at different distances from the cutting edge 514. As shown in FIG. 9, the fulcrum 620B is located a distance D8 from the cutting edge 514. In certain example embodiments, fulcrums 620A and 520B can both be located a distance D2 from the cutting edge 514 that is less than the distance D8, though those skilled in the art should understand that in other example embodiments, slot 518 and/or slot 618 may be configured such that fulcrums 520B and 620A are located at different distances from the cutting edge 514. In certain example embodiments, the distance D2 can be anywhere within the range of approximately 1.1 inches to approximately 1.4 inches and the distance D8 can be anywhere within the range of approximately 1.6 inches to approximately 1.85 inches. In one example, fulcrum 520A is located a distance D1 from the cutting edge 514 that is less than the distance D2 (and D5). In certain example embodiments, the distance D1 is anywhere in the range of approximately 1.1 inches to approximately 1.4 inches. In the example embodiment of FIG. 9, both slots 518 and 618 have the same height D5, though those skilled in the art should understand that slot 518 and slot 618 may be configured such that each has different height from each other. In certain example embodiments, the distance D5 is anywhere in the range of approximately 0.6 inch to approximately 1.2 inches. Fulcrums located at different distances from the cutting edge 514 can provide an improved capability to remove slugs of different thicknesses from the blade body 510 using the different fulcrums provided. Alternatively, this feature permits fulcrums that are successively closer to the cutting edge 514 to be used successfully to lever a slug toward the cutting edge 514. Further, the provision of fulcrums at multiple distances (e.g., three or more) from the cutting edge 514, as shown in FIG. 9, is achieved while decreasing the amount of material removed from the blade body 510 as compared to, for example, the embodiments of FIGS. 1-5. In this manner, the loss of strength and/or stiffness of the blade body 510 is reduced.

The hole cutters as disclosed herein may include one or more features of the hole cutters disclosed and/or claimed in any of the following patents and patent applications and are hereby expressly incorporated herein by reference in their entireties as part of the present disclosure: U.S. patent application Ser. No. 12/687,052 filed on Jan. 10, 2010, titled "Coated Hole Cutter"; U.S. Pat. No. 8,573,907 issued Nov. 5, 2013, titled "Hole Cutter With Minimum Tooth Pitch to Blade Body Thickness Ratio"; U.S. patent application Ser. No. 12/687,102 filed on Jan. 13, 2010, titled "Hole Cutter With Extruded Cap"; U.S. patent application Ser. No. 12/687,078 filed on Jan. 10, 2010, titled "Hole Cutter With Chip Egress Aperture"; U.S. Design Pat. No. D690,334 issued Sep. 24, 2014, titled "Hole Saw"; U.S. Design Pat. No. D659,176 issued May 8, 2012, titled "Hole Saw"; and U.S. Design Pat. No. D692,470 issued Oct. 29, 2013 titled "Hole Saw".

It may be readily understood by those having skill in the pertinent art from the present disclosure that any of numerous changes and modifications may be made to the above-described and other embodiments without departing from the scope and spirit of the invention as defined in the appended claims. For example, the hole cutters may be made from any of numerous different materials, in any of numerous shapes, taking any of numerous different dimensions. For example the cutting edge may be made from any of numerous different materials or combinations of materials that are currently known or that later become known. As an example, the cutting edge may take any form, pattern, arrangement or configuration that is currently known or that later becomes known, including without limitation, tooth patterns that tend to function well in specific applications, hybrid applications or general applications. For example, the cutting teeth may include any of numerous different tooth forms, pitch patterns and/or set patterns. As another example, a single aperture/slot may be provided in the blade body of the hole cutter, two or more apertures/slots may be angularly and/or axially aligned with one another, or two or more apertures/slots may be variably angularly and/or axially spaced relative to one another. Also, the hole cutters may be used in any of a number of different cutting applications, on any of a number of different work piece materials, such as woods, metals, plastics, composites, resins, stones, fabrics, foams, etc. Further, one or more apertures/slots may extend to the cutting edge, to the rim of the side wall or cap, or even extend to both the cutting edge and to the rim of the side wall or cap. As another example, the length or width of each fulcrum may not be the same from fulcrum to fulcrum or slot to slot. As yet another example, the fulcrum surfaces may not extend linearly in a direction perpendicular to the axis of rotation of the hole cutter about the circumference of the hole cutter. Instead, the fulcrum surfaces may define or otherwise include curved, curvilinear, rectilinear, angled surfaces and/or combinations of the foregoing. Still further, the aperture/slot side edges may not extend linearly and axially to define the angular width of the angled slots or apertures and connect the outer-lying fulcrums to the bottom edge surface of the apertures by radiused corners. Instead, for example, the aperture/slot side edges may be curved, curvilinear, rectilinear, angled and/or any combination of the foregoing, and the intersections of the aperture/slot side edges and the end surfaces of the apertures/slots and the outer-lying fulcrums may be right, obtuse and/or acute intersections, or may define rectilinear and/or curvilinear corners. Similarly, the surfaces that extend between the fulcrums may not be linear and the transitions between the surfaces may not be defined by radiuses. As an alternative, for example, these surfaces may be curved, curvilinear, rectilinear and/or alternatively angled, and the transitions between these surfaces may be right, obtuse and/or acute intersections or may define curvilinear and/or rectilinear corners. As another example, additional surfaces may be included, or surfaces may be removed, from the apertures, such as surfaces located adjacent to, or between, the fulcrums. In addition, the axially-elongated apertures or slots may define a different number of fulcrums or like surfaces than illustrated herein, or some axially-elongated apertures or slots may define a different number of type of fulcrums than other apertures or slots of the same hole cutter. Accordingly, this detailed description of some example embodiments is to be taken in an illustrative, as opposed to a limiting sense.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments.

What is claimed is:

1. A hole cutter comprising:
a substantially cylindrical blade body defining a cutting edge;
at least one first elongated aperture formed through the blade body and spaced from the cutting edge; and
at least one second aperture formed through the blade body, wherein the second aperture is separate from the first aperture and is spaced from the first aperture and from the cutting edge such that a portion of the blade body extends between the second aperture and the first aperture and a portion of the blade body extends between the second aperture and the cutting edge;
wherein each of the first and second apertures is configured to receive therethrough a lever for removing a work piece slug from an interior of the blade body, and the blade body defines (i) within the first aperture, a first fulcrum axially spaced a first distance from the cutting edge and a second fulcrum axially spaced a second distance from the cutting edge that is different from the first distance, and (ii) within the second aperture, a third fulcrum axially spaced from the cutting edge a third distance that is different from the first distance and the second distance, wherein each of the first, second and third fulcrums is configured for engaging the lever and levering slugs out of the interior of the blade body.

2. The hole cutter of claim 1, wherein the second aperture and the first fulcrum are substantially axially-aligned relative to an axis of the hole cutter.

3. The hole cutter of claim 1, wherein the second aperture is angularly spaced around the circumference of the blade body relative to the first and second fulcrums.

4. The hole cutter of claim 3, wherein the cutting edge defines a direction of rotation of the hole cutter, and wherein the second aperture is angularly spaced relative to the first and second fulcrums in the direction of rotation.

5. A hole cutter comprising:
a substantially cylindrical blade body comprising a first end defining a cutting edge;
at least one elongated aperture formed through the blade body, wherein the elongated aperture is configured to receive therethrough a lever for removing a work piece slug from the interior of the blade body, and the blade body defines within the elongated aperture a plurality of fulcrums comprising:
a first fulcrum axially spaced a first distance from the cutting edge; and
a second fulcrum axially spaced a second distance from the cutting edge and greater than the first distance; and
a second aperture separate from the at least one elongated aperture, wherein material of the blade body is located between the second aperture and the at least one elongated aperture, wherein the second aperture is configured to receive therethrough the lever for removing the work piece slug from the interior of the blade body, and the blade body defines within the second aperture a third fulcrum spaced a third distance from the cutting edge for engaging the lever and levering the work piece slug out of the interior of the blade body.

6. The hole cutter of claim 5, wherein the second aperture has a top end that is spaced a fourth distance from the cutting edge, wherein the fourth distance is different than the first distance and the second distance.

7. The hole cutter of claim 6, wherein the fourth distance is less than the first distance and the second distance.

8. The hole cutter of claim 6, wherein the fourth distance is at least approximately 0.15 inches.

9. The hole cutter of claim 5, wherein the second aperture and the first aperture are substantially axially-aligned relative to an axis of rotation of the hole cutter.

10. The hole cutter of claim 5, wherein the second aperture is angularly spaced around a circumference of the blade body relative to the first and second fulcrums.

11. The hole cutter of claim 10, wherein the cutting edge defines a direction of rotation of the hole cutter, and wherein the second aperture is angularly spaced relative to the first and second fulcrums in the direction of rotation.

12. A hole cutter comprising:
a substantially cylindrical blade body comprising a first end and a distal second end, the first end defining a cutting edge and the second end defining a non-working end;
a first elongated aperture formed through the blade body, wherein the blade body defines within the first elongated aperture a first plurality of fulcrums comprising:
a first fulcrum axially spaced a first distance from the cutting edge; and
a second fulcrum axially spaced a second distance from the cutting edge greater than the first distance; and a second elongated aperture formed through the blade body, wherein the blade body defines within the second elongated aperture a second plurality of fulcrums comprising:
   a third fulcrum axially spaced a third distance from the cutting edge; and
   a fourth fulcrum axially spaced a fourth distance from the cutting edge greater than the third distance,
wherein the first distance of the first fulcrum to the cutting edge is different than the third distance of the third fulcrum to the cutting edge.

13. The hole cutter of claim 12, wherein a shape of the first elongated aperture is substantially the same as a shape of the second elongated aperture.

14. The hole cutter of claim 12, wherein a shape of the first elongated aperture is different than a shape of the second elongated aperture.

15. The hole cutter of claim 12, wherein the first and second elongated apertures are each oriented at an acute angle relative to an axis of rotation of the blade body.

16. The hole cutter of claim 15, wherein the cutting edge defines a direction of rotation of the hole cutter, and wherein the first fulcrum of the first elongated aperture is angularly spaced on the blade body relative the third fulcrum of the second aperture in the direction of rotation.

\* \* \* \* \*